(12) United States Patent
Donofrio et al.

(10) Patent No.: US 9,243,777 B2
(45) Date of Patent: Jan. 26, 2016

(54) RARE EARTH OPTICAL ELEMENTS FOR LED LAMP

(71) Applicant: CREE, INC., Durham, NC (US)

(72) Inventors: Matthew Donofrio, Raleigh, NC (US); Gerald Negley, Chapel Hill, NC (US); Shaow B. Lin, Morrisville, NC (US)

(73) Assignee: Cree, Inc., Durham, NC (US)

( * ) Notice: Subject to any disclaimer, the term of this patent is extended or adjusted under 35 U.S.C. 154(b) by 57 days.

(21) Appl. No.: 13/837,379

(22) Filed: Mar. 15, 2013

(65) Prior Publication Data

US 2014/0268794 A1    Sep. 18, 2014

(51) Int. Cl.
  C09K 11/06    (2006.01)
  F21V 9/08     (2006.01)
  G02B 1/04     (2006.01)

(52) U.S. Cl.
  CPC . *F21V 9/08* (2013.01); *C09K 11/06* (2013.01); *G02B 1/04* (2013.01); *C09K 2211/182* (2013.01)

(58) Field of Classification Search
  CPC ........................................................ F21V 9/08
  USPC ........................................................ 524/130
  See application file for complete search history.

(56) References Cited

U.S. PATENT DOCUMENTS

| | | | |
|---|---|---|---|
| 3,581,162 A | 5/1971 | Wheatley | |
| 5,463,280 A | 10/1995 | Johnson | |
| 5,561,346 A | 10/1996 | Byrne | |
| 5,585,783 A | 12/1996 | Hall | |
| 5,655,830 A | 8/1997 | Ruskouski | |
| 5,688,042 A | 11/1997 | Madadi et al. | |
| 5,806,965 A | 9/1998 | Deese | |
| 5,947,588 A | 9/1999 | Huang | |
| 5,949,347 A | 9/1999 | Wu | |
| 6,197,218 B1 | 3/2001 | Hampden-Smith | |
| 6,220,722 B1 | 4/2001 | Begemann | |
| 6,224,798 B1 * | 5/2001 | Gay | 264/102 |
| 6,227,679 B1 | 5/2001 | Zhang et al. | |
| 6,234,648 B1 | 5/2001 | Borner et al. | |
| 6,250,774 B1 | 6/2001 | Begemann et al. | |
| 6,276,822 B1 | 8/2001 | Bedrosian et al. | |
| 6,465,961 B1 | 10/2002 | Cao | |
| 6,523,978 B1 | 2/2003 | Huang | |
| 6,550,953 B1 | 4/2003 | Ichikawa et al. | |
| 6,634,770 B2 | 10/2003 | Cao | |
| 6,659,632 B2 | 12/2003 | Chen | |
| 6,709,132 B2 | 3/2004 | Ishibashi | |
| 6,803,607 B1 | 10/2004 | Chan et al. | |
| 6,848,819 B1 | 2/2005 | Arndt et al. | |
| 6,864,513 B2 | 3/2005 | Lin et al. | |
| 6,948,829 B2 | 9/2005 | Verdes et al. | |
| 6,982,518 B2 | 1/2006 | Chou et al. | |
| 7,048,412 B2 | 5/2006 | Martin et al. | |
| 7,080,924 B2 | 7/2006 | Tseng et al. | |
| 7,086,756 B2 | 8/2006 | Maxik | |
| 7,086,767 B2 | 8/2006 | Sidwell et al. | |
| 7,144,135 B2 | 12/2006 | Martin et al. | |
| 7,165,866 B2 | 1/2007 | Li | |
| 7,172,314 B2 | 2/2007 | Currie et al. | |
| 7,213,940 B1 | 5/2007 | Van De Ven et al. | |
| 7,354,174 B1 | 4/2008 | Yan | |
| 7,396,142 B2 | 7/2008 | Laizure, Jr. et al. | |
| 7,600,882 B1 | 10/2009 | Morejon et al. | |
| 7,726,836 B2 | 6/2010 | Chen | |
| 7,824,065 B2 | 11/2010 | Maxik | |
| 7,965,023 B1 | 6/2011 | Liang | |
| 8,021,025 B2 | 9/2011 | Lee | |
| 8,253,316 B2 | 8/2012 | Sun et al. | |
| 8,272,762 B2 | 9/2012 | Maxik et al. | |
| 8,274,241 B2 | 9/2012 | Guest et al. | |
| 8,277,082 B2 | 10/2012 | Dassanayake et al. | |
| 8,282,249 B2 | 10/2012 | Liang et al. | |
| 8,282,250 B1 | 10/2012 | Dassanayake et al. | |
| 8,292,468 B2 | 10/2012 | Narendran et al. | |
| 8,322,896 B2 | 12/2012 | Falicoff et al. | |
| 8,371,722 B2 | 2/2013 | Carroll | |
| 8,400,051 B2 | 3/2013 | Hakata et al. | |
| 8,415,865 B2 | 4/2013 | Liang et al. | |
| 8,421,320 B2 | 4/2013 | Chuang | |
| 8,421,321 B2 | 4/2013 | Chuang | |
| 8,421,322 B2 | 4/2013 | Carroll et al. | |
| 8,427,037 B2 | 4/2013 | Liang et al. | |
| 8,449,154 B2 | 5/2013 | Uemoto et al. | |
| 8,502,468 B2 | 8/2013 | Li et al. | |

(Continued)

FOREIGN PATENT DOCUMENTS

EP    1058221 A2    12/2000
EP    0890059 B1    6/2004

(Continued)

OTHER PUBLICATIONS

U.S. Appl. No. 13/774,078, filed Feb. 22, 2013.
U.S. Appl. No. 13/467,670, filed May 9, 2012.
U.S. Appl. No. 13/446,759, filed Apr. 13, 2012.
European Patent Office, International Application No. PCT/US2014/024664 International Search Report and Written Opinion dated Jun. 16, 2014, 9 pages.
International Bureau of WIPO; International Preliminary Report on Patentability for International Application No. PCT/US2014/024664 dated Sep. 24, 2015, 6 Pages.

*Primary Examiner* — Doris Lee
(74) *Attorney, Agent, or Firm* — Christopher J. Knors; Moore & Van Allen PLLC

(57) ABSTRACT

The present disclosure relates to optical elements and coatings comprising rare-earth element (REE) compounds for light wavelength attenuation of light emitting diode (LED) elements and lamps. More particularly, the present disclosure relates to LED elements and lamps comprising wavelength attenuating elements comprising REE compounds having at least a portion of non-crystalline, non-hydrate form, methods of preparing such elements, and LED elements, LED arrays, LED packages, optical elements, lamps and systems made with same.

28 Claims, 10 Drawing Sheets

(56) References Cited

U.S. PATENT DOCUMENTS

| | | |
|---|---|---|
| 8,556,465 B2 | 10/2013 | Lee et al. |
| 8,641,237 B2 | 2/2014 | Chuang |
| 8,653,723 B2 | 2/2014 | Cao et al. |
| 8,696,168 B2 | 4/2014 | Li et al. |
| 8,740,415 B2 | 6/2014 | Wheelock |
| 8,750,671 B1 | 6/2014 | Kelly et al. |
| 8,752,984 B2 | 6/2014 | Lenk et al. |
| 8,760,042 B2 | 6/2014 | Sakai et al. |
| 2004/0201990 A1 | 10/2004 | Meyer |
| 2005/0186443 A1 | 8/2005 | Marrocco |
| 2007/0007884 A1 | 1/2007 | Iwanaga |
| 2007/0228932 A1* | 10/2007 | Amano et al. ............ 313/502 |
| 2009/0184618 A1 | 7/2009 | Hakata et al. |
| 2012/0040585 A1 | 2/2012 | Huang |

FOREIGN PATENT DOCUMENTS

| | | |
|---|---|---|
| EP | 1849848 A1 | 10/2007 |
| EP | 2264125 A1 | 12/2010 |
| EP | 2426186 A1 | 3/2012 |
| EP | 2716732 A1 | 4/2014 |
| GB | 2345954 A | 7/2000 |
| JP | H09265807 A | 10/1997 |
| JP | 2000173304 A | 6/2000 |
| JP | 2001118403 A | 4/2001 |
| WO | 0124583 A1 | 4/2001 |
| WO | 0160119 A2 | 8/2001 |
| WO | 2012011279 A1 | 1/2012 |
| WO | 2012031533 A1 | 3/2012 |
| WO | WO 2012/165290 A1 | 12/2012 |

* cited by examiner

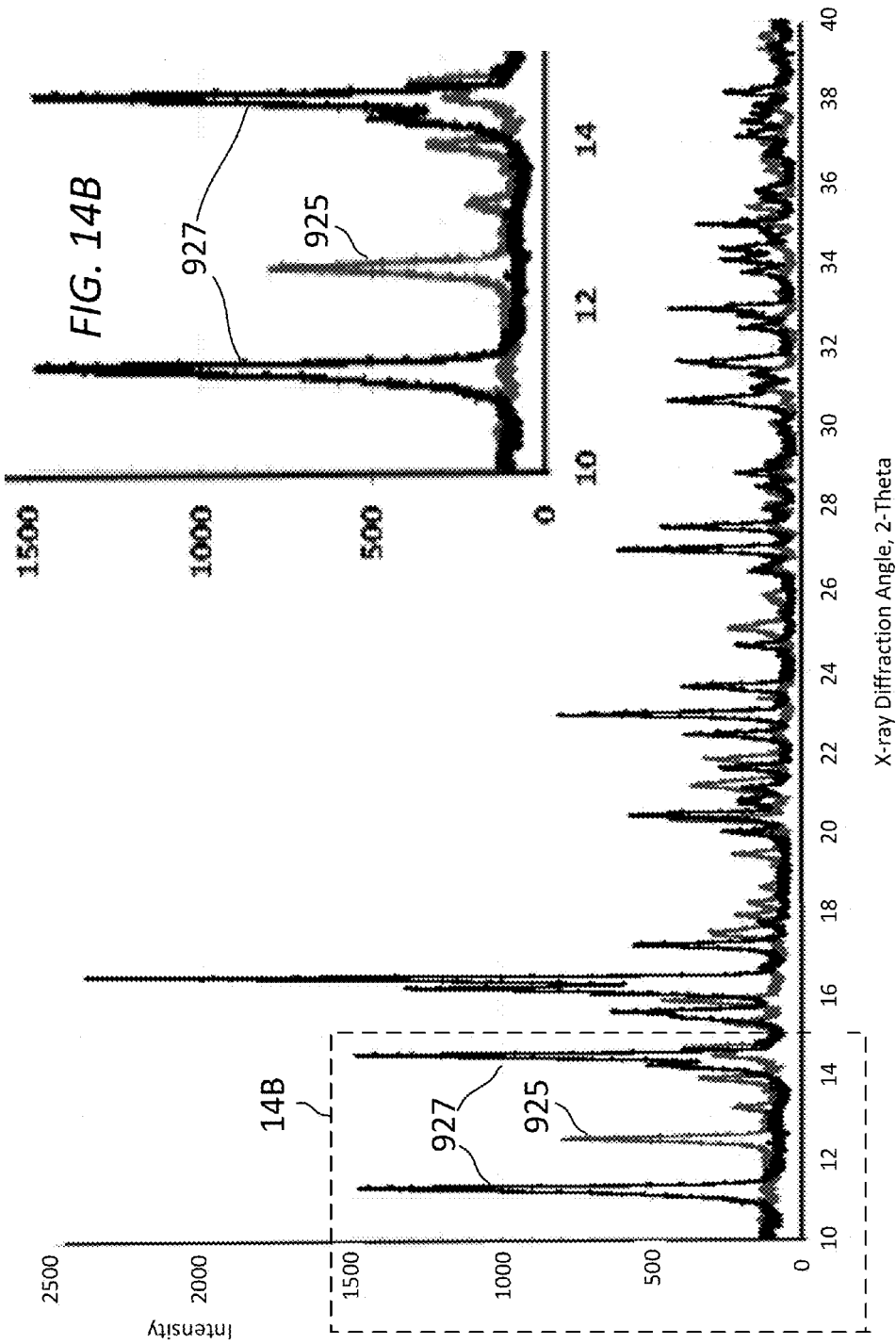

RARE EARTH OPTICAL ELEMENTS FOR LED LAMP

TECHNICAL FIELD

The present disclosure relates to optical elements comprising rare-earth element (REE) compounds for light wavelength attenuation of light emitting diode (LED) elements and lamps. More particularly, the present disclosure relates to LED elements and lamps comprising wavelength attenuating optical elements comprising one or more REE compounds present in an amount of non-crystalline form or non-hydrate form, methods of preparing such optical elements, and LED devices and lamps made with such optical elements.

BACKGROUND

Light emitting diode (LED) lighting systems are becoming more prevalent as replacements for older lighting systems. LED systems are an example of solid state lighting (SSL) and have advantages over traditional lighting solutions such as incandescent and fluorescent lighting because they use less energy, are more durable, operate longer, can be combined in multi-color arrays that can be controlled to deliver virtually any color light, and generally contain no lead or mercury.

An LED lighting system may include, for example, a packaged light emitting device including one or more light emitting diodes (LEDs), which may include inorganic LEDs, which may include semiconductor layers forming p-n junctions and/or organic LEDs (OLEDs), which may include organic light emission layers. Light perceived as white or near-white may be generated by a combination of red, green, and blue ("RGB") LEDs. Output color of such a device may be altered by separately adjusting supply of current to the red, green, and blue LEDs. Another method for generating white or near-white light is by using a lumiphor such as a phosphor. Still another approach for producing white light is to stimulate phosphors or dyes of multiple colors with an LED source. Many other approaches can be taken.

An LED lamp may be made with a form factor that allows it to replace a standard incandescent bulb, or any of various types of fluorescent lamps. LED lamps often include some type of optical coating or elements to allow for localized mixing of colors, collimate light, or provide a particular light pattern. Sometimes the optical element also serves as an envelope or enclosure for the electronics and or the LEDs in a lamp. LED lamps and LED light fixtures can use either transmissive optical element or reflective optical elements. For example, a so-called "troffer" style ceiling fixture includes a reflector that serves and an optical element, and in some circumstances may include additional optical elements such as glass plates or lenses.

Color reproduction can be an important characteristic of any type of artificial lighting, including LED lighting. Color reproduction is typically measured using the color-rendering index (CRI). The CRI is a relative measurement of how the color rendition of an illumination system compares to that of a theoretical blackbody radiator. In practical terms, the CRI is a relative measure of the shift in surface color of an object when lit by a particular source. The CRI equals 100 if the color coordinates of a set of test surfaces being illuminated by the lamp are the same as the coordinates of the same test surfaces being irradiated by the theoretical blackbody radiator. Daylight has the highest CRI (100), with incandescent bulbs being relatively close, and fluorescent lighting being less accurate (70-85). Certain types of specialized lighting, such as mercury vapor and sodium lights exhibit a relatively low CRI (as low as about 40 or even lower).

An LED lamp or fixture may need to be self-contained. In such a case, a power supply is included in the lamp structure or fixture along with the LEDs or LED packages and the optical components. A heatsink is also often needed to cool the LEDs and/or power supply in order to maintain appropriate operating temperature. The power supply and especially the heatsink can often block some of the light coming from the LEDs in at least one direction. If the bulb of fixture is intended as a replacement for a traditional bulb or fixture, this blocking of light can cause the solid-state system to emit light in a pattern that is substantially different than the light pattern produced by the traditional light source. Optical elements for solid state lighting systems are sometimes shaped or placed to compensate for such effects.

SUMMARY

In a first embodiment, composition is provided. The composition comprising a polymer matrix comprising at least one rare-earth element (REE) compound, at least an amount of the REE compound present in an amorphous or non-crystalline form, or present substantially without hydrate forms.

In a second embodiment, a method of preparing a composition is provided. The method comprising: providing a polymer matrix or one or more polymer matrix precursors; combining at least one REE compound with the polymer matrix or the polymer matrix precursor, the at least one REE compound having a crystalline form or a hydrate form; and heating the combination of the at least one REE compound and polymer matrix or the polymer matrix precursor above a thermal transition temperature of the at least one REE compound.

In a third embodiment, an optical element is provided. The optical element comprising at least one REE compound, at least an amount of the REE compound present in a non-crystalline form or non-hydrate form, the optical element shaped to receive at least some light from at least one LED, wherein the optical element attenuates at least an amount of the total wavelength of the at least one LED's light incident to the optical element.

In a fourth embodiment, an LED device is provided. The LED device comprising: at least one LED chip configured to emit a wavelength distribution of light; and an optical element arranged to receive at least a portion of the wavelength distribution of light from the at least one LED chip, the optical element comprising at least one REE compound, at least an amount of the REE compound present in a non-crystalline form or non-hydrate form, the optical element disposed to attenuate at least a first portion of the wavelength distribution; and wherein the optical element is transmissive of at least a second portion of the of the wavelength distribution.

In a fifth embodiment, an LED lighting system is provided. The LED lighting system comprising an LED array operable to emit a wavelength distribution of light when energized through an electrical connection; an optical element comprising at least one REE compound, at least an amount of the REE compound present in a non-crystalline form or non-hydrate form, the optical element disposed to attenuate at least a first portion of the wavelength distribution; and wherein the optical element is transmissive of at least a second portion of the of the wavelength distribution; and a power supply connected to the LED array through the electrical connection.

BRIEF DESCRIPTION OF THE DRAWINGS

FIG. 10E is an expanded view of a section of FIG. 10D depicting a coating of an embodiment of the present disclosure.

FIG. 14A is an x-ray diffraction spectra of an exemplary REE compound after a process in accordance with an embodiment of the present disclosure.

FIG. 14B is an expanded view of a section of the x-ray diffraction spectra of FIG. 14A.

DETAILED DESCRIPTION

Figure 1:
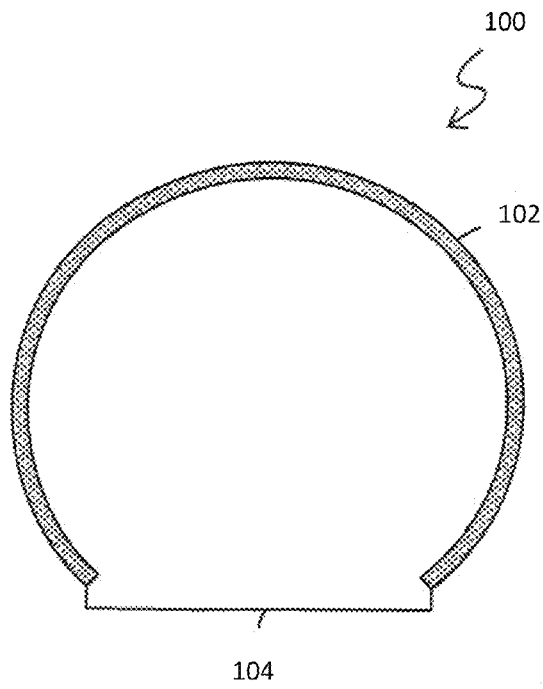
FIG. 1 is a cross-sectional view of a transmissive optical element according to some example embodiments of the present disclosure.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated' listed items.

It will be understood that when an element such as a coating, layer, region or substrate is referred to as being "deposited" or "deposited onto" or "on" or extending "onto" another element, it can be deposited on, or be directly on, or extend directly onto the other element or intervening elements may also be present. In contrast, when an element is referred to as being "directly deposited" or deposited "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this present disclosure belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (e.g., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 2200K to about 6000K.

The terms "crosslink" and "crosslinking" as used herein refer without limitation to joining (e.g., adjacent chains of a polymer) by creating covalent or ionic bonds. Crosslinking can be accomplished by known techniques, for example, thermal reaction, chemical reaction or ionizing radiation (for example, UV/Vis radiation, electron beam radiation, X-ray, or gamma radiation, catalysis, etc.).

The phrase "precursor component" is used herein interchangeably with "coating matrix" and "matrix," and refers without limitation to one or more materials or one or more compositions of matter that are capable of transitioning from a liquid to a solid or gel suitable for use in or with a light emitting device as a coating of, around, or about one or more components of the lighting device. The solid or gel can be crosslinked.

The terms "non-crystalline" and "amorphous" are used interchangeably and when used in the context of the present disclosure are inclusive of a complete absence of crystallinity or a detectable reduction in an initial amount of crystallinity of a compound, for example, after being subjected to a heat capable of causing a thermal transition in the compound. For example, a crystalline or semi-crystalline material that is heated and results in a reduction of the total amount of crystallinity compared to before heating would be considered to contain an amount of non-crystalline or amorphous material. Thermal transitions can be endothermic or exothermic and can be measured, for example, using calorimetric devices and techniques, including, for example, differential scanning calorimetry (DSC). Melting of crystallinity is a thermal event, typically endothermic, that is detectable by DSC, and is a characteristic thermal event in crystalline or semi-crystalline material. Thermal transitions for REE compounds include, for example, all or partial loss of water of hydration, melting, or other transformations, including reactions with other material/matrixes that may be present. In some instances for certain REE compounds particularly those with hydrates, it contains several thermal events and may not be possible to determine exactly the nature of the thermal transition other than determining that an endothermic or exothermic event has taken place upon heating, for example, by using DSC or Fourier Transform Infrared Spectroscopy (FT-IR).

A solid-state lighting system may take the form of a lighting unit, light fixture, light bulb, or a "lamp." A solid-state lighting system includes an LED lighting system. An LED lighting system may include, for example, a packaged light emitting device including one or more light emitting diodes (LEDs), which may include inorganic LEDs, which may include semiconductor layers forming p-n junctions and/or organic LEDs (OLEDs), which may include organic light emission layers. Light perceived as white or near-white may be generated by a combination of red, green, and blue ("RGB") LEDs. Output color of such a device may be altered by separately adjusting supply of current to the red, green, and blue LEDs. Another method for generating white or near-white light is by using a lumiphor such as a phosphor. Still another approach for producing white light is to stimulate phosphors or dyes of multiple colors with an LED source. Many other approaches can be taken.

An LED lamp may be made with a form factor that allows it to replace a standard incandescent bulb, or any of various types of fluorescent lamps. LED lamps often include some type of optical coating or elements to allow for localized mixing of colors, collimate light, or provide a particular light pattern. Sometimes the optical element also serves as an envelope or enclosure for the electronics and or the LEDs in the lamp.

Embodiments of the present disclosure provide an optical element that includes coatings and solid forms, suitable for LED devices and LED lighting systems (lamps and/or fixtures) comprising one or more REE compounds, where spectral notch filtering introduced by the optical element improves the color-rendering index (CRI) of the light emitted directly or indirectly from one or more LEDs of the LED devices or LED lighting system. The present disclosure, in at least one aspect, addresses a technical problem where warm white light created by a combination of LEDs and/or phosphor may be either under-saturated with certain colors (or wavelength ranges) of the visible spectrum or oversaturated with certain colors. In some devices, fixtures, and/or lamps, notch filtering according to one or more example embodiments of the present disclosure can be used to alleviate oversaturation created by a combination of LEDs and/or phosphor, thereby improving the CRI of the LED device and/or system.

In some embodiments, an optical element is positioned to receive and thereafter affect at least some incident light directly or indirectly from at least one LED (hereinafter also referred to as "the incident light"). The incident light passing through, reflected by, and/or otherwise interacting with the optical element causes one or more portions of the total incident light's wavelength to be attenuated, which is also referred to as "spectral notching" or, if referring to the portion(s) of the incident light's spectral wavelength that is attenuated, the "spectral notch."

In some embodiments, the present coating herein disclosed provides at least one spectral notch between the wavelengths of 520 nm and 605 nm of the visible spectrum. In other embodiments, the at least one spectral notch occurs between the wavelengths of 565 nm and 600 nm. In other embodiments, the at least one spectral notch occurs between the wavelengths of 570 nm and 595 nm.

In embodiments, the optical element is made to act as a notch filter for spectral notching, for example, the optical element comprises one or more REE compounds. Rare earth compounds are inclusive of inorganic or organometallic compounds, and independently, their salts, hydrates, and de-hydrate, and is also inclusive of all polymorphic forms thereof. The one or more REE compounds can be, for example, one or more compounds of neodymium, didymium, dysprosium, erbium, holmium, praseodymium and thulium.

In one embodiment, the one or more REE compounds are neodymium(III) nitrate hexahydrate ($Nd(NO_3)_3.6H_2O$); neodymium(III) acetate hydrate ($Nd(CH_3CO_2)_3.xH_2O$); neodymium(III) hydroxide hydrate ($Nd(OH)_3$); neodymium(III) phosphate hydrate ($NdPO_4.xH_2O$); neodymium(III) carbonate hydrate ($Nd_2(CO_3)_3.xH_2O$); neodymium(III) isopropoxide ($Nd(OCH(CH_3)_2)_3$); neodymium(III) titanante ($Nd_2O_3$ titanate.$xTiO_2$); neodymium(III) chloride hexahydrate ($NdCl_3.6H_2O$); neodymium(III) fluoride ($NdF_3$); neodymium(III) sulfate hydrate ($Nd_2(SO_4)_3.xH_2O$); neodymium(III) oxide ($Nd_2O_3$); erbium(III) nitrate pentahydrate ($Er(NO_3)_3.5H_2O$); erbium(III) oxalate hydrate ($Er_2(C_2O_4)_3.xH_2O$); erbium(III) acetate hydrate ($Er(CH_3CO_2)_3.xH_2O$); erbium(III) phosphate hydrate ($ErPO_4.xH_2O$); erbium(III) oxide ($Er_2O_3$); Samarium(III) nitrate hexahydrate ($Sm(NO_3)_3.6H_2O$); Samarium(III) acetate hydrate ($Sm(CH_3CO_2)_3.xH_2O$); Samarium(III) phosphate hydrate ($SmPO_4.xH_2O$); Samarium(III) hydroxide hydrate ($Sm(OH)_3.xH_2O$); samarium(III) oxide ($Sm_2O_3$); holmium(III) nitrate pentahydrate ($Ho(NO_3)_3.5H_2O$); holmium(III) acetate hydrate (($CH_3CO_2)_3Ho.xH_2O$); holmium(III) phosphate ($HoPO_4$); and holmium(III) oxide ($Ho_2O_3$). Other REE compounds, including organometallic compounds of neodymium, didymium, dysprosium, erbium, holmium, praseodymium and thulium can be used. In embodiments, the loading of rare earth compounds (before heating) can be between about 0.5 weight percent to about 35 weight percent, between about 1 weight percent to about 30 weight percent, between about 5 weight percent to about 25 weight percent, between about 10 weight percent to about 20 weight percent. Other weight percent loadings can be used. In other embodiments, the above loadings can be present in solutions, e.g., for dip coating, spraying, etc., and in resultant films, the films thereof having a thickness tailored to the optical properties of the REE compound, including, for example, absorbance. Film thickness of the above films with the above loadings can be between about 0.001 micron thick to about 1 millimeter thick. Other thickness or more specific thickness, based on the REE compound optical properties (or the combination of a plurality of REE's) can be determined and employed.

In some embodiments, for example, in reflective applications where the optical element is an optical coating is associated with a reflector, the optical coating can used together with an optical interference film or means for optical interference in some other way. A color pigment can also be added to an optical coating to impart additional notch filtering properties to the optical coating.

In some embodiments, the notch-filtering optical coating is used in a device with a plurality of interconnected LED chips. In some such embodiments, the optical coating is shaped and positioned to affect the light from the LED chips by notch-filtering the spectrum of light emitted from the LED chips. In other words, one or more portions of the wavelength distribution emitted from the LEDs (alone or in combination) is attenuated by the present optical coating. The optical coating can be positioned remotely from a plurality of LEDs. For example, the optical coating with at least one REE compound with non-crystalline or amorphous content can be packaged or encapsulated with a chip in a package within a small lens or window, or can be applied to the die as a coating. In other aspects, the present optical coating can be deposited on or deposited directly on one or more of a plurality of LEDs to provide this effect independently to one or more LEDs (e.g, of different color, intensity, etc).

In some embodiments, at least some of the LED chips are coated with the present optical coating, includes an associated phosphor to provide wavelength conversion. This phosphor can be packaged or encapsulated with a chip in a package with a small lens or window, or can be applied to the die as a coating. The combination of multiple interconnected LED chips, phosphor and a notch filtering optical coating with at least one REE compound with non-crystalline or amorphous content enables a light source in some embodiments with a CRI of at least about 84. In some embodiments, the light source has a CRI of at least about 89. In some embodiments, the light source has a CRI of at least about 91. Such an LED device can be embodied in a lamp, a lamp component, or multichip device.

The lighting system may be configured as an LED lamp. Such an LED lamp can include an LED array operable to emit light when energized through an electrical connection and an optical enclosure that is transmissive of the light while notch filtering the light. A lamp according to at least some embodiments also includes a power supply or driver to supply power to the LED array through the electrical connection. A at least one REE compound with non-crystalline or amorphous content, alone or in combination with one or more phosphors may again be used to provide wavelength attenuation and/or conversion. The at least one REE compound with non-crystalline or amorphous content and phosphor may be locally associated with one or more LED chips as previously described, or may be associated with all the LED chips in the LED array by being remotely located on the enclosure or a carrier within the system. In some embodiments, the enclosure can be filled with an optically transmissive, fluid medium in thermal communication with the LED array. The fluid medium can cool the LED chips and in some embodiments the driver, to enable construction of a lamp with smaller components or without a heatsink to obstruct light. In certain embodiments, the one or more REE compounds having non-crystalline and/or non-hydrate form can be included in this fluid medium, and can be prepared in accordance with the present methods.

In some embodiments the lighting system is configured as an LED light fixture with a reflector as at least one of the optical elements. For example, the fixture can hang suspended from a ceiling or be installed in a drop ceiling. Such a fixture could be any shape or size. In some example embodiments, a linear fixture such as a troffer fixture can be used. In some embodiments, the reflector is coated with a layer that includes a REE compound of one the types already discussed. The at least one REE compound with non-crystalline or amorphous content can be introduced into the reflector in other ways, for example, by brushing, dipping, spraying, or otherwise impregnating particulate into or on the surface of which the reflector is made. A color pigment can also be used in addition to the REE compound. An optical interference film coating can also be used to introduce notch filtering in a reflector. A system according to some embodiments of the present disclosure may have a CRI of at least about 84, in some embodiments, a CRI of at least about 89, and in some embodiments, a CRI of at least about 91, whether the system is configured as a lamp or a fixture.

An LED device according to example embodiments of the present disclosure can be assembled by selecting a plurality of LED chips based on desired light output characteristics, interconnecting the LED chips and attaching the presently disclosed optical element or coating to the device. In some embodiments, phosphor is included. In some embodiments, the optical element or coating is made by mixing a REE compound or color pigment as previously described to a thermoplastic, thermoplastic elastomer, a silicone, a polysiloxane, a polyurethane, a thermoset, or other moldable material with sufficient heating to cause a thermal transition of the REE compound. A thermal transition includes loss of hydrate, melting, or other detectable exothermic/endothermic transition. In one aspect, sufficient heating includes up to but not exceeding a decomposition point of the thermoplastic, silicone, polyurethane, thermoset, or other moldable material. The REE compound with non-crystalline or amorphous content can be formed "in-situ" and disbursed or distributed in the material for application in the form of a lens or coating.

In some embodiments, a lighting system such as a lamp or fixture can be assembled by providing an optical coating to notch filter the spectrum of light emitted by the LED array. A power supply is also provided and connected. Optionally, one or more phosphors and/or an optically transmissive fluid medium can be included. Thermoplastic, thermoplastic elastomer, thermoset, silicone, polysiloxane, poly(meth)acrylate, polysiloxane, polyurethane, paper, or other materials with one or more REE compounds with non-crystalline or non-hydrate content or an optical interference film can be used in combination with these materials.

Thus, one or more embodiments of the present disclosure can include an LED system including at least one LED and an optical element (inclusive of coatings) comprising at least one REE compound with non-crystalline or amorphous content that affects the light such that at least one portion of the wavelength distribution of light emitted from one or more LEDs (alone or collectively) is attenuated. The portion of the wavelength distribution of light emitted from the one or more LEDs (alone or collectively) that is attenuated can be in the visible region of light. In other words, light intensity is reduced within a predetermined portion of a visible spectrum of light emitted by the system. An LED system can be a lamp, a fixture, a multi-chip component, a single LED, an array of LEDs, an enclosure, or any portion or combination of the forgoing. The present optical coating for such a system can be reflective or transmissive. The present optical coating can be said to affect the light from an LED even if the light has been effectively wavelength converted, e.g., by a phosphor, prior to interacting with the REE compound with non-crystalline or amorphous content of the optical coating, if a combination of light from at least one LED and at least one phosphor is used. When an LED system according to example embodiments of the present disclosure is operated, an LED or LEDs and a phosphor or phosphors are energized and the visible light intensity produced is filtered so that the intensity is comparatively reduced within one or more portions (wavelength regions) of the visible spectrum. The term comparatively reduced means reduced relative to the output of the same or similar system without an optical coating with notch filtering qualities. The effect is to increase the CRI in such as system. In some embodiments, the increase can be at least four points. In some embodiments of an LED system, the light intensity is comparatively reduced by a peak of about 75 percent. In some embodiments, the light intensity is comparatively reduced by a peak of about 50 percent. In some embodiments, the light intensity is comparatively reduced by a peak amount between about 5 percent and about 100 percent. In some embodiments, the full width of a spectral notch corresponding to the comparative reduction at half the maximum is about 10 nm and wherein the color rendering index (CRI) of the LED system is at least about 84. In some embodiments, the full width of a spectral notch corresponding to the comparative reduction at half the maximum is about 20 nm and wherein the color rendering index (CRI) of the LED system is at least about 91. In some embodiments, a center wavelength for the spectral notch is between 580 and 600 nm. In some embodiments, the comparative reduction at half the maximum is between 10 and 20 nm and the center wavelength for the notch is between about 520 and about 605 nm. The notch can exhibit a predetermined shape profile.

The optical coating herein disclosed (hereinafter also referred to interchangeably as "the coating") at least partially covers one or more LEDs, and/or covers one or both of the internal surface and the external surface of a portion of the LED lighting device, as described above, including but not limited to one or more LED chips, LED arrays, enclosures, reflectors, etc. The coating may include a plurality of discrete layers of the same or different rare earth material, including crystalline rare earth material separate or combined with REE compound with non-crystalline or amorphous content, or may be deposited on one or more existing layers previously deposited, or the coating can be at least partially covered by one or more layers ("cover layers"). In one aspect, the one or more deposited layers or cover layers can contain one or more phosphors, diffusers, and other optical materials.

The present disclosure also provides, among other aspects, the preparation and process of preparing and/or applying the presently disclosed optical element. Thus, in one embodiment, a mixture of one or more precursors of a curable coating, or a thermoplastic, thermoplastic elastomer, or thermoset composition and at least one REE compound capable of a thermal transition at or below the maximum use temperature of the precursor components, a curable coating, or a thermoplastic or thermoset composition. The mixture is heated such that at least one of the REE compounds undergoes a thermal transition so as to provide a REE compound with non-crystalline or non-hydrate content. In one aspect, the mixture is heated such that at least one of the REE compounds undergoes a thermal transition so as to provide a REE compound with substantially non-crystalline or substantially non-hydrate content. For example, a substantially non-crystalline or non-hydrate content has more than 51 percent, more than 75 percent, more than 90 percent, up to about 100 percent amorphous phase or absence of waters of hydration, as measured by conventional techniques.

Accordingly, in one embodiment of the present disclosure is provided a mixture of thermoplastic, and/or thermoplastic elastomer, and/or thermoset, and/or precursor, and/or a curable coating comprising at least one REE compound capable of a thermal transition at or below the maximum use temperature of the precursor components, wherein at least one of the REE compounds undergoes a thermal transition so as to provide at least a quantity of the REE compound with non-crystalline or amorphous content. In some aspects, one or more of the precursor components and/or curable coating has at least one reactive group suitable for physical or chemical coupling and/or crosslinking. In additional embodiments, an essentially solvent free coating composition is provided with long-term self-life suitable for the manufacturing of large numbers of LED lamps with excellent process latitude.

Embodiments of the present disclosure now will be described more fully hereinafter with reference to the accompanying drawings, in which embodiments of the present disclosure are shown. This present disclosure may, however, be embodied in many different forms and should not be construed as limited to the embodiments set forth herein. Rather, these embodiments are provided so that this disclosure will be thorough and complete, and will fully convey the scope of the claims to those skilled in the art. Like numbers refer to like elements throughout.

In certain aspects, LED lamp may include an environment comprising one or more gases within the optically transmissive, frangible enclosure so as to provide thermal coupling to the LED array and any power supply components that might be included therein. A combination of gasses can be used. Examples include one or more of inert gases (e.g., helium, neon, argon, krypton, etc.), hydrogen, halocarbons such as chlorofluorocarbons, and hydrochlorofluorocarbon. In one aspect, gas or gases with a thermal conductivity in milliwatts per meter Kelvin (mW/m-K) of from about 45 to about 180 can be used. For purposes of this disclosure, thermal conductivities are given at standard temperature and pressure (STP). It is to be understood that thermal conductivity values of gasses may change at different pressures and temperatures. Gasses can be used with an embodiment of the present disclosure where the gas has a thermal conductivity of at least about 45 mW/m-K, least about 60 mW/m-K, at least about 70 mW/m-K, least about 100 mW/m-K, at least about 150 mW/m-K, from about 60 to about 180 mW/m-K, or from about 70 to about 150 mW/m-K. The coating may be configured to allow minutes, hours, days, or weeks of acceptable and/or functional operation without overheating under a condition where a frangible enclosure of the LED lamp is partially or completely compromised, the gas or gases escape or change in composition. The coating can be selected based on its diffusion and/or transport properties of the particular gases used and/or to complement its optical transmissive properties.

Of course, the optical element as a coating disclosed herein can provide for some level of resistance to breach of the frangible enclosure by virtue of its physical properties and/or coating thickness, such as its elongation and compressibility properties. These attributes, alone or in combination are provided to the LED lamp with the coating herein described. In other embodiments, the coating can be applied over at least a portion of one or more preexisting layers and/or under one or more additional layers containing the particulate materials or other optical materials. The coating can completely cover the one or more preexisting or additional layers. It should also be noted that the term "lamp" is meant to encompass not only a solid-state replacement for a traditional incandescent bulb as illustrated herein, but also replacements for fluorescent bulbs, replacements for complete fixtures, and any type of light fixture that may be custom designed as a solid state fixture for mounting on walls, in or on ceilings, on posts, and/or on vehicles.

Coating Materials

The curable coating and/or precursor components herein disclosed provide, among other things, a light transparent polymeric matrix, optionally of a low index of refraction. Suitable curable coating and/or one or more precursor components providing low index of refraction or highly visible light transparent organic polymers include silicones, polyesters, polyurethanes, acrylics (e.g., polyacrylates, polymethacrylates, hereafter "poly(meth)acrylates"), epoxies, fluoropolymers, cyclic olefinic copolymers, and combinations thereof.

Preferably, the resultant light transparent polymeric matrix has an index of refraction of less than about 1.6, preferably less than about 1.5 to about 1.3. In one aspect, the light transparent polymeric matrix (without REE compound) is transparent in the visible spectra and/or at least a portion of the UV region (e.g., from about 200 nanometers to about 850 nanometers). In other aspects, the light transparent polymeric matrix is transparent in the visible spectra and not transparent (e.g., substantially absorbing) in the UV region (e.g., from about 200 nanometers to about 850 nanometers). Preferably, the light transparent polymeric matrix is at least 85 percent transparent in the visible spectra, at least 90 percent transparent, or at least 95 percent transparent corresponding to the wavelength(s) of the LED light emitted from the package.

In one aspect, the precursor component comprises only one precursor. In another aspect, the precursor component is comprised of a "two-part composition" either both of or one of which can contain the REE compound. The precursor component is any one or more precursors that are suitable for and capable of providing an optically transparent coating for use in a lighting device and/or capable of being heated to a temperature sufficient to cause a thermal transition of the one or more REE compounds. The precursor component provides for a cured or set coating optionally with other components. The cured or set coating prepared from the precursor components includes, sol-gels, gels, glass-like materials, thermoplastics, thermoplastic elastomers, thermosets, cross-linked polymers, and combinations thereof.

Examples of cured or set matrixes formed from the one or more precursor components include, for example, one or more polymers and/or oligomers of silicones, e.g., polysiloxanes (e.g., polydialklysiloxanes (e.g., polydimethylsiloxane "PDMS"), polyalkylaryl siloxanes and/or polydiarylsiloxanes), epoxy resins, polyesters, polyarylesters, polyurethanes, and/or copolymers thereof, or such materials in combination with other components. Examples of LED coatings include, without limitation, LIGHT CAP® LED Casting Resin 9622 acrylated polyurethane, (Dynamax Corp., Torringtion Conn.); LPS-1503, LPS-2511, LPS-3541, LPS-5355, KER-6110, KER-6000, KER-6200, SCR-1016, ASP-1120, ASP-1042, KER-7030, KER-7080 (Shin-Etsu Chemical Co., Ltd, Japan); QSil 216, QSil 218, QSil 222, and QLE 1102 Optically Clear, 2-part Silicone coating (ACC Silicones, The Amber Chemical Company, Ltd.), United Kingdom); LS3-3354 and LS-3351 silicone coatings from NuSil Technology, LLC (Carpinteria, Calif.); TSE-3032, RTV615, (Momentive Potting Silicone, Waterford, N.Y.); Epic S7253 Polyurethane coating (Epic Resins, Palmyra, Wis.); OE-6630, OE-6631, OE-6636, OE-6336, OE-6450, OE-6652, OE-6540, OE-7630, OE-7640, OE-7620, OE-7660, OE-6370M, OE-6351, OE-6570, JCR-6110, JCR-6175, EG-6301, SLYGUARD silicone elastomers (Dow Corning, Midland, Mich.).

Preferably, the one- or two part-curable precursor component(s) are of low solvent content. More preferably, the one- or two part-curable precursor component(s) are essentially solvent-free. Essentially solvent-free is inclusive of no solvent and trace amounts of low volatility components, where trace amounts is solvent is present, but at an amount less than 5 weight percent, less than 1 weight percent, and less than 0.5 weight percent.

In one aspect, the coating comprises one or more silicon precursor components, which can comprise siloxane and/or polysiloxane. A number of polysiloxanes, with varying backbone structure are suitable for use as a precursor component. With reference to Equation (1), various forms of polysiloxanes, e.g., the M, T, Q, and D backbones, where R is, independently, alkyl or aryl, are presented:

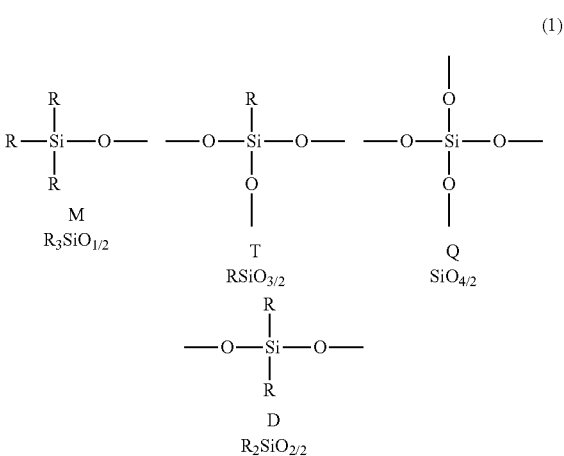

In various aspects, precursor components comprise one or more reactive silicone containing polymers (and/or oligomers or formulations comprising same). Such one or more reactive functional groups can be mixed with non-reactive silicone containing polymers. Examples of reactive silicone containing polymers with reactive groups, include for example, linear or branched polysiloxanes containing at least one acrylate, methacrylate, acrylamide, methacrylamide, fumarate, maleate, norbornenyl and styrene functional groups, and/or linear or branched polysiloxanes with multiple reactive groups such as Si—H (silicon hydride), hydroxy, alkoxy, amine, chlorine, epoxide, isocyanate, isothiocyanate, nitrile, vinyl, and thiol functional groups. Some specific examples of such linear or branched polysiloxanes include hydride-terminated, vinyl-terminated or methacrylate-terminated polydimethyl siloxanes, polydimethyl-co-diphenyl siloxanes and polydimethyl-co-methylphenylsiloxanes. The reactive groups can be located at one or both terminuses of the reactive silicone polymers, and/or anywhere along the backbone and/or branches of the polymer.

In one aspect, an exemplary example of a silicone precursor component comprises linear siloxane polymers, with dimethyl or a combination of methyl and phenyl chemical groups, with one or more reactive "R" chemical groups; where R is independently, hydrogen, vinyl or hydroxyl. In another aspect, an exemplary example of a silicone precursor component comprises branched siloxane polymers, with dimethyl or a combination of methyl and phenyl chemical groups with one or more reactive "R" chemical groups, where R is independently hydrogen, vinyl or hydroxyl) associated with the precursor component. In another aspect, an exemplary example of a silicone precursor component comprises linear siloxane polymers, with a combination of methyl, phenyl and hydroxyl or alkoxy chemical groups, with one or more reactive "R" chemical groups where R is hydrogen, vinyl or hydroxyl associated with the precursor component. In another aspect, an exemplary example of a silicone precursor component comprises branched siloxanes, with any of methyl, phenyl and hydroxyl or alkoxy chemical groups, with one or more reactive "R" chemical groups where R is hydrogen, vinyl or hydroxyl associated with the precursor component.

Additional substances in the aforementioned coating or one or more precursor components providing the coating can be used, e.g., platinum catalyst, casting aids, defoamers, surface tension modifiers, functionalizing agents, adhesion promoters, crosslinking agents, viscosity stabilizers, other polymeric substances, and substances capable of modifying the tensile, elongation, optical, thermal, rheological, and/or morphological attributes of the precursor component or resulting coating.

In one aspect, a curable precursor component comprising the REE compound (before or after thermal treatment), or with other material, e.g., phosphors, diffusers, etc., can be used specifically for forming a coating or an enclosure for a LED lamp, for example, a LED lamp enclosure surrounding the LEDs and/or electrical components.

In one aspect, one or more polymers and/or oligomers of polysiloxanes are used. The one or more polymers and/or oligomers of polydialklysiloxanes (e.g., polydimethylsiloxane PDMS), polyalkylaryl siloxanes and/or polydiarylsiloxanes can comprise one or more functional groups selected from acrylate, methacrylate, acrylamide, methacrylamide, fumarate, maleate, norbornenyl and styrene functional groups, and/or polysiloxanes with multiple reactive groups such as hydrogen, hydroxy, alkoxy, amine, chlorine, epoxide, isocyanate, isothiocyanate, nitrile, vinyl, and thiol functional groups. Some specific examples of such polysiloxanes include vinyl-terminated-, hydroxyl-terminated, or methacrylate-terminated polydimethyl-co-diphenyl siloxanes and/or polydimethyl-co-methylhydro-siloxanes. In one aspect, the function group is located at one or both terminuses of the precursor component.

In one aspect, precursor components comprising or consisting essentially of silsesquioxane moieties and/or polysilsesquioxane moieties can be employed for the coating. Polyhedral oligomeric silsesquioxanes and/or polysilsesquioxanes may be either homoleptic systems containing only one type of R group, or heteroleptic systems containing more than one type of R group. POSS-moieties are inclusive of homo- and co-polymers derived from moieties comprising silsesquioxanes with functionality, including mon-functionality and multi-functionality. Poly-POSS moieties encompass partially or fully polymerized POSS moieties as well as grafted and/or appended POSS moieties, end-terminated POSS moieties, and combinations.

Examples of suitable POSS moieties encompassed by the present disclosure include, but are not limited to, the following open-cage and/or closed cage molecules, having from zero up to and including eight non-reactive or reactive sites, where each of the sites, independently, can be substituted/unsubstituted alkyl-, branched/un-branched alkyl-, cyclic/acyclic alkyl-, hydroxyl-, alkoxyl-, amine-, halo/chloro-, epoxy-, isocyanate-, acrylate/methacrylate-, acrylamide/methacrylamide-, nitrile-, norbornenyl-, vinyl-, hydrogen-, thiol-, silanol-, aryl, substituted aryl, and/or styrenyl-containing groups.

In another embodiment, the precursor components comprise at least one homo- and co-polymers (or oligomers) formed with POSS moieties as part of the polymer backbone and/or as an appendage from the polymer, inclusive of polysilsesquioxanes described above. Examples of polysilsesquioxanes include, for example, polystyryl-POSS, poly{meth}acrylate-POSS, polynorbornyl-POSS, polyvinyl-POSS, polyepoxy-POSS, and polysiloxane-POSS. Poly-POSS moieties are further inclusive of the aforementioned polymers and other functionalized polymers that are configured to incorporate the silsesquioxane functionality as an appendage from, or within a polymer backbone.

In one aspect, one or more POSS moieties having one or more Si—H (silicon hydride) groups can be used and/or added to precursor components, e.g., silicones having Si-vinyl functional groups) to provide a coating via a platinum metal catalyzed hydrosilation reaction between the POSS hydride functionality and precursor component Si-vinyl functional groups. The Si—H and Si-vinyl functional groups can be reversed, that is, Si-vinyl groups can be associated with the POSS moiety and Si—H functional groups can be associated with the precursor components. Likewise, combinations of POSS moieties comprising, independently, Si—H and Si-vinyl functional groups can be used as the precursor components.

In one aspect, one or more viscosity stabilizers are used in combination with the one or more precursor components, for example, to extend the useful life of the coating prior to its application to the LED lamp. In one aspect, the viscosity stabilizer provides for a slow increase in viscosity of a curable one- or two-part-composition prepared in the course of coating an LED lamp. In one particular aspect, the viscosity stabilizer is specific for a platinum metal and/or rhodium noble metal catalyzed hydrosilation reaction between a Si-hydride and Si-vinyl functional groups. In one aspect, viscosity stabilizer can include phosphines, alkynic or alkynl alcohols, allyl or other unsaturated compounds can also be used, compounds containing tin, fatty acid tin salts, such as those used in tin-catalyzed silicone release coatings; general compounds, pigments, fillers, additives; minerals; pigments; fillers such as silica, titanium oxide, aluminum oxide, alumina, titania, calcium carbonate containing compounds listed previously; sodium salts, such as sodium alginate or carboxymethylcellulose sodium salt, clays or binders that use polyvinylacetate or acrylics, anti-slip, antifoamants, antioxidant or other additives, polyvinylacetate; polyvinylacetate/acrylic; and the like.

The above compositions can be catalyzed by a platinum and/or rhodium catalyst component, which can be all of the known platinum or rhodium catalysts which are effective for catalyzing the reaction between silicon-bonded hydrogen groups and silicon-bonded olefinic groups.

In certain aspects, while it is preferred to coat over a phosphor-containing layer, the coating with REE compound can further comprise one or more of phosphors and/or a diffusing material. Thus, in any one or more of the aforementioned precursor component embodiments or resultant coating, a phosphor and/or diffuser can be added, incorporated therein, associated therewith, and/or combined. Phosphors include, for example, commercially available YAG:Ce, although a full range of broad yellow spectral emission is possible using conversion particles made of phosphors based on the $(Gd,Y)_3(Al,Ga)_5O_{12}$:Ce system, such as the $Y_3Al_5O_{12}$:Ce (YAG). Other yellow phosphors that can be used for white-light emitting LED chips include, for example: $Tb_{3-x}RE_xO_{12}$:Ce(TAG), where RE is Y, Gd, La, Lu; or $Sr_{2-x-y}Ba_xCa_ySiO_4$:Eu.

Some phosphors appropriate for the LED lamp disclosed can comprise, for example, silicon-based oxynitrides and nitrides for example, nitridosilicates, nitridoaluminosilicates, oxonitridosilicates, oxonitridoaluminosilicates, and sialons. Some examples include: $Lu_2O_3$:$Eu^{3+}$$(Sr_{2-x}La_x)(Ce_{1-x}Eu_x)$ $O_4Sr_2Ce_{1-x}Eu_xO_4Sr_{2-x}Eu_xCeO_4SrTiO_3$:$Pr^{3+}$,$Ga^{3+}$ $CaAlSiN_3$:$Eu^{2+}$$Sr_2Si_5N_8$:$Eu^{2+}$ as well as $Sr_xCa_{1-x}S$:EuY, where Y is halide; $CaSiAlN_3$:Eu; and/or $Sr_{2-y}Ca_ySiO_4$:Eu. Other phosphors can be used to create color emission by converting substantially all light to a particular color. For example, the following phosphors can be used to generate green light: $SrGa_2S_4$:Eu; $Sr_{2-y}Ba_ySiO_4$:Eu; or $SrSi_2O_2N_2$:Eu.

By way of example, each of the following phosphors exhibits excitation in the UV emission spectrum, provides a desirable peak emission, has efficient light conversion, and has acceptable Stokes shift, for example: Yellow/Green: (Sr, Ca,Ba)$(Al,Ga)_2S_4$:$Eu^{2+}$$Ba_2(Mg,Zn)Si_2O_7$:$Eu^{2+}$ $Gd_{0.46}Sr_{0.31}Al_{1.23}O_xF_{1.38}$:$Eu^{2+}_{0.06}$$(Ba_{1-x-y}Sr_xCa_y)SiO_4$: $EuBa_2SiO_4$:$Eu^{2+}$.

The lighting device can comprise solid-state light sources arranged with one or more phosphors so as to provide at least one of blue-shifted yellow (BSY), blue-shifted green (BSG), blue-shifted red (BSR), green-shifted red (GSR), and cyan-shifted red (CSR) light. Thus, for example, a blue LED with a yellow emitting phosphor radiationally coupled thereto and absorbing some of the blue light and emitting yellow light provides for a device having BSY light. Likewise, a blue LED with a green or red emitting phosphor radiationally coupled thereto and absorbing some of the blue light and emitting green or red light provides for devices having BSG or BSR light, respectively. A green LED with a red emitting phosphor radiationally coupled thereto and absorbing some of the green light and emitting red light provides for a device having GSR light. Likewise, a cyan LED with a red emitting phosphor radiationally coupled thereto and absorbing some of the cyan light and emitting red light provides for a device having CSR light.

Diffusers include light reflecting particles, for example, from material of high index of refraction. The high index of refraction material can be any material with an index of refraction of greater than about 2, greater than about 2.2, and greater than or equal to about 2.4, such as titanium dioxide, aluminum oxide, zinc oxide, zinc sulfide and combinations thereof. The average particle size of the diffuser particles can be between about 1 nanometer (nanoparticles) to about 500 microns, or between about 50 nm to about 500 nm, or about 100 nm to about 300 nanometer. The diffuser can be added alone or in combination with the phosphor to the curable coating or to either part (Part A and/or Part B) or both parts of a two-part curable coating.

A lighting system using the combination of BSY and red LED devices referred to above to make substantially white light can be referred to as a BSY plus red or "BSY+R" system. In such a system, the LED devices used include LEDs operable to emit light of two different colors. In one example embodiment, the LED devices include a group of LEDs, wherein each LED, if and when illuminated, emits light having dominant wavelength from 440 to 480 nm. The LED devices include another group of LEDs, wherein each LED, if and when illuminated, emits light having a dominant wavelength from 605 to 630 nm. A phosphor can be used that, when excited, emits light having a dominant wavelength from 560 to 580 nm, so as to form a blue-shifted-yellow light with light from the former LED devices. In another example embodiment, one group of LEDs emits light having a dominant wavelength of from 435 to 490 nm and the other group emits light having a dominant wavelength of from 600 to 640 nm. The phosphor, when excited, emits light having a dominant wavelength of from 540 to 585 nm. A further detailed example of using groups of LEDs emitting light of different wavelengths to produce substantially while light can be found in issued U.S. Pat. No. 7,213,940, which is incorporated herein by reference.

LED lamps of any variety and/or shape can be used in the practice of the present disclosure. By way of example, LED lamps are disclosed as exemplary lighting devices suitable for the present disclosure. The lamp may also comprise a directional lamp such as BR-style lamp or a PAR-style lamp where the LEDs may be arranged to provide directional light, with or without reflecting surfaces. In other embodiments, the LED lamp can have any shape, including standard and non-standard shapes. In some embodiments, the LED bulb is equivalent to a 60 Watt incandescent light bulb. In one embodiment of a 60 Watt equivalent LED bulb, the LED assembly comprises an LED array of 20 XLamp® XT-E High Voltage white LEDs manufactured by Cree, Inc., where each XLamp® XT-E LED has a 46 V forward voltage and includes 16 DA LED chips manufactured by Cree, Inc. and configured in series. The XLamp® XT-E LEDs may be configured having LEDs arranged in series, for a total of greater than 200 volts, e.g., about 230 volts, across the LED array 1128. In another embodiment of a 60 Watt equivalent LED bulb, 20 XLamp® XT-E LEDs are used where each XT-E has a 12 V forward voltage and includes DA LED chips arranged in series, for a total of about 240 volts across the LED array in this embodiment. In some embodiments, the LED bulb is equivalent to a 40 Watt incandescent light bulb. In such embodiments, the LED array may comprise 10 XLamp® XT-E LEDs where each XT-E includes 16 DA LED chips configured in series. The 10 46V XLamp® XT-E® LEDs may be configured in two parallel strings where each string has five LEDs arranged in series, for a total of about 230 volts across the LED array. In other embodiments, different types of LEDs are possible, such as XLamp® XB-D LEDs manufactured by Cree, Inc. or others. Other arrangements of chip on board LEDs and LED packages may be used to provide LED based light equivalent to 40, 60 and/or greater other watt incandescent light bulbs, at about the same or different voltages across the LED array. In other embodiments, the LED assembly can have different shapes, such as triangular, square and/or other polygonal shapes with or without curved surfaces.

FIG. 1 is a cross-sectional view of an optical element according to some embodiments of the present disclosure. Optical element 100 includes a dome-shaped form 102, made of glass or other material, which has been coated with or comprises at least one rare earth compound with at least an amount of non-crystalline or amorphous content, schematically indicated by the dotted pattern within the thickness of the dome-shaped form 102. Such an optical element could also be made of a polymer, including a silicone, polysiloxane polymer, polyurethane, thermoplastic, thermoset, polyester etc. In use, optical element 100 is part of a lamp that an LED assembly resides e.g., just inside, or near the opening 104. The thickness of the dome portion of the optical element as shown in FIG. 1 as well as the thicknesses and sizes of portions of all the drawings herein may be exaggerated for clarity. Such features are not necessarily shown to scale in any of the drawings. Other examples of LED lamps are those disclosed in co-assigned U.S. application Ser. No. 13/774,078, as filed on Feb. 22, 2013, U.S. application Ser. No. 13/467,670, as filed on May 9, 2012, and U.S. application Ser. No. 13/446,759, as filed on Apr. 13, 2012, all of which are incorporated by reference herein in its entirety.

The optical element FIG. 1 is transmissive of light. However, due to the at least one rare earth compound with at least an amount of non-crystalline or amorphous content, light passing through the dome of the optical element is attenuated so that the light exiting the dome exhibits a spectral notch. Depending on the type or composition of at least one rare earth compound used to form or coat the optical element, and the amount and type of other trace substances in the optical element, the spectral notch can occur between the wavelengths of 520 nm and 605 nm. In some embodiments, the spectral notch can occur between the wavelengths of 565 nm and 600 nm. In other embodiments, the spectral notch can occur between the wavelengths of 570 nm and 595 nm. A reflector may also serve as a notch-filtering optical element for a lighting system.

Figure 2:
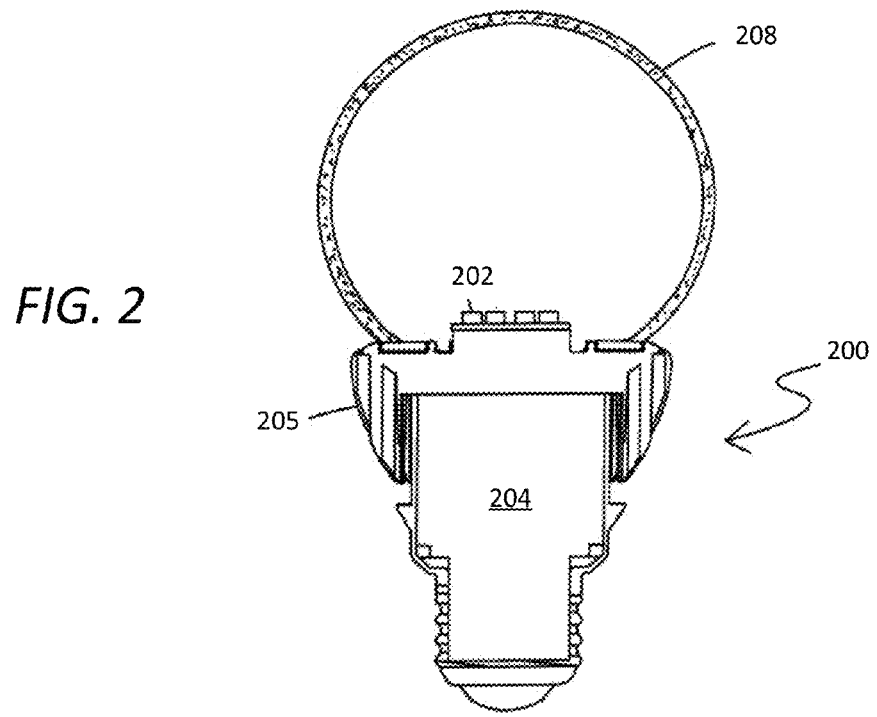
FIG. 2 is a cross-sectional view of an LED lamp according to some embodiments of the present disclosure.

FIG. 2 is a cross-sectional view of a finished LED lighting system according to example embodiments of the present disclosure. The LED lighting system of FIG. 2 is configured as a lamp 200 and includes an LED assembly including a plurality of LED devices 202 and power supply 204. The power supply is conventional in nature and so details are not shown. Cooling for both the LED devices and power supply 204 is enhanced by heatsink 205. Other arrangements of heat sinks can be used.

Lamp 200 includes optical element 208 to protect some of the other lamp components and provide direction and/or diffusion for the light from the lamp. Optical element 208, in this embodiment, is essentially a light transmissive globe. Optical element 208 can be made of glass or plastic as was described above for lamp 100. In the example of FIG. 2, an optical element like that shown in FIG. 1 is being used in lamp 200. Due to at least one rare earth compound with at least an amount of non-crystalline or amorphous content used as a coating, for example, on either or both surfaces of dome 208, light passing through the dome of optical element 208 is filtered so that the light exiting the dome exhibits the spectral notch previously described. The various additional portions of the LED lamp 200 according to example embodiments of the present disclosure can be made of any of various materials. The heat sink can be made of metal, as can the various portions of the housings for the components of the lamp. Plastic with enhanced thermal conductivity can also be used to form the heat sink, and various plastics and polymers can be used for other portions of the lamp as well.

A lamp like that shown in FIG. 2 can be made with or without an internal structure to carry a phosphor to provide wavelength conversion. The size of optical element 208 can vary widely. In the example of FIG. 2, the optical element includes a lip that rests in spaces in the top of heatsink 205. The optical element can then be fastened in place with thermal epoxy. Other fastening methods can be used to fasten an optical element to the other parts of the lamp. As examples, globes can be threaded and can screw into or onto the lamp. A tab-and-slot or similar mechanical arrangement could be used, as could fasteners such as screws or clips.

Still referring to FIG. 2, blue or violet LEDs can be used in the lamp and the appropriate phosphor can be used with an optional internal carrier or globe and energized to create white light. LED devices can be used with phosphorized coatings packaged locally with the LEDs to create various colors of light which can then be mixed and combined to emit white light, which is then notch filtered by optical element 208 having deposited on or deposited directly on the phosphorized coatings at least one rare earth compound with at least an amount of non-crystalline or amorphous content to create substantially white light. The at least one REE compound can contain crystalline REE compounds that do not undergo a thermal transition at or below the decomposition temperature or cure temperature of the matrix they are contained in. For example, a neodymium nitrate can be used together with a neodymium oxide, or another REE oxide, a REE silicate, a REE aluminate, or crushed REE-doped glass particles. For example, a neodymium nitrate can be used together with a neodymium oxide or crushed REE-doped glass particles, which when heated in a two part polysiloxane resin, would provide at least one REE compound that undergoes a thermal transition at or below the decomposition temperature or cure temperature of the matrix (e.g., de-hydration and/or melting) that also contains at least one crystalline REE compound, e.g., the oxide or glass particles, that does not undergo a thermal transition at or below the decomposition temperature or cure temperature of the matrix.

Example embodiments of a lamp like that shown in FIG. 2 can produce light with a CRI of at least 84, at least 89, or at least 91. By use of the term substantially white light, one could be referring to a chromaticity diagram including a blackbody locus of points, where the point for the source falls within four, six or ten MacAdam ellipses of any point in the blackbody locus of points. It should be noted that numerous rare earth compounds having appropriate thermal properties so as to provide at least an amount of non-crystalline or amorphous content can be used to introduce notch-filtering properties, for example, compounds of neodymium, dysprosium, erbium, holmium, praseodymium and thulium.

Figure 3:
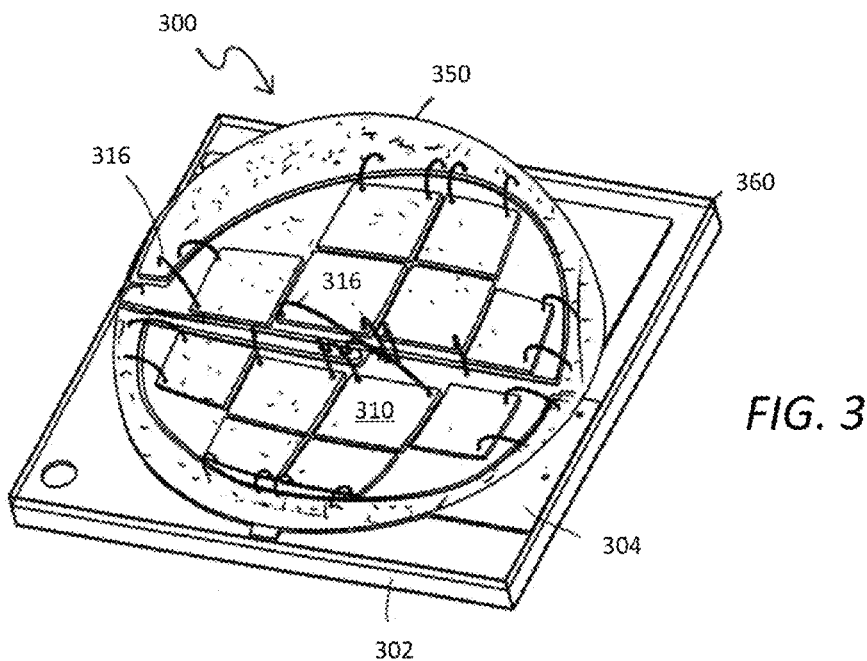
FIG. 3 is a perspective view of an LED device according to some example embodiments of the present disclosure.

FIG. 3 is a perspective view of an LED device 300 according to some example embodiments of the present disclosure. LED device 300 makes use of submount 302 with a pattern of metal 304 to provide some of the interconnections between the LED chips, other possible components such as ESD protection diodes (not visible) and an external power supply. LED device 300 includes twelve LED chips 310 fastened to metal layer 304. The anodes are on the bottom of the LED chips 310 and are in contact with metal layer 304 and the cathodes of the LED chips are connected by wire bonds 316 to portions of metal 304 on submount 302. The LED chips of LED device 300 of FIG. 3 can be fastened to the submount with conductive adhesive, solder, a welding process, or in any of various other ways. As before, the device is completed with an optical element 350 placed on top of the device to affect light from the LED chips that can contain a coating or have contained within at least one rare earth compound with at least an amount of non-crystalline or amorphous content. In addition to or independent of the optical element 350, at least one rare earth compound with at least an amount of non-crystalline or amorphous content, alone as a layer or in combination with one or more phosphor layers can be applied to or encapsulated with all or some of the LED chips 310. In one aspect, the REE containing coating is deposited on (or directly on) the one or more phosphor layers, the latter of which can be deposited on or directly deposited on LED chips.

Still referring to FIG. 3, the LED chips in device 300 may be selected from various light color bins to provide a combined light output with appropriate color characteristics for a desired application. The unfiltered efficiency of such an LED device with a warm white color, often desired for incandescent replacement lighting, may be as much as about 100 lumens (lm)/Watt (W), prior to any filtering from the optical element 350, the at least one rare earth compound with at least an amount of non-crystalline or amorphous content, and/or the at least one phosphor. However, if the device is binned for a cool white color, an efficiency of as much as about 150 lm/W can be achieved, again prior to filtering. The design of the LED device of FIG. 3 can be adapted so that various types of LED chips could be used, such as direct-bond chips, flip-chips, and chips with substrates made of sapphire, silicon carbide, silicon or other materials.

Still referring to FIG. 3 the optical element 350, which may function as a lens, is visible over the two groups of six LED chips and submount 302. The distortion introduced by the lens can also be seen. A lens for use with an LED device of an embodiment of the present disclosure may be made of glass or plastic, may be molded in place or elsewhere, or otherwise formed or attached to the device as desired. In one aspect, when optical element 350 is glass, at least one rare earth compound with at least an amount of non-crystalline or amorphous content can be coated on one or both sides thereof. For a plastic lens, for example, a lens molded in place from silicone, at least one rare earth compound can be compounded or otherwise distributed or dispersed therein. In such embodiments, the at least one rare earth compound can be heated with all or a precursor of the plastic, so as to provide at least one REE compound with at least an amount of non-crystalline or amorphous content. In the example of FIG. 3, the lens is formed with a square flat portion 360 that covers the submount to align the lens and aid in assembling the device. In one aspect, lens 350 of device 300 includes a coating comprising at least one rare earth compound with at least an amount of non-crystalline or amorphous content as previously discussed, so that light passing through the lens is filtered to enable the light emitted by component 300 to exhibit a spectral notch. This notch filtering of the light enables the component in some embodiments to exhibit the relatively high CRI previously described.

Figure 4:
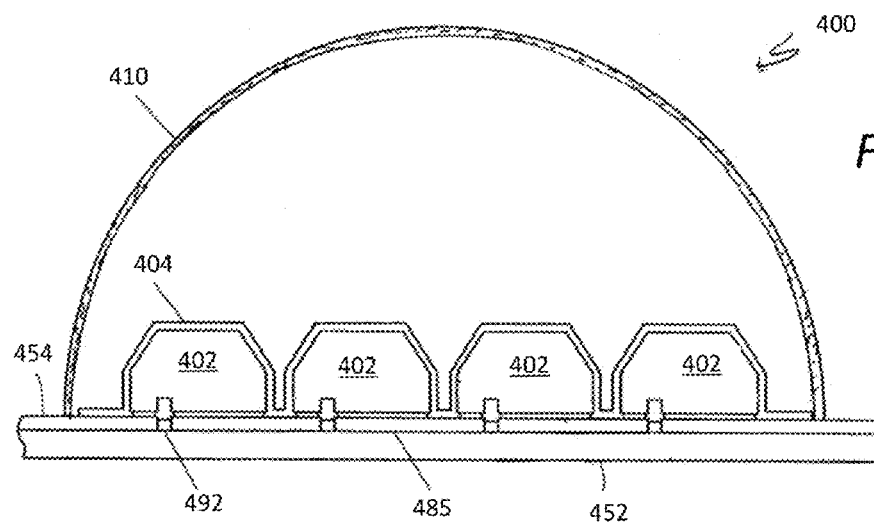
FIG. 4 is a cross-sectional view of another LED device according to some example embodiments of the present disclosure.

FIG. 4 shows another illustrative LED device 400. The device of FIG. 4 is shown in cross-section, and includes "flip-chip" LEDs, with both anode and cathode connection pads on the bottom. In this example, some or all of LED dies 402 can include a conformal layer 404 that comprises at least one rare earth compound with at least an amount of non-crystalline or amorphous content. In another example, some or all of LED dies 402 can include a conformal layer 404 that comprises at least one rare earth compound with at least an amount of non-crystalline or amorphous content in combination with one or more phosphors. If all LED devices are to include the layer 404, the layer can be continuous as shown in this example, or alternatively, in some example embodiments, the layer's thickness is less than half the spacing between adjacent die. Device 400 includes lens 410, which can be combined with layer 404, or used independently as an optical element that can be doped, coated, or otherwise include at least one rare earth compound so that, as previously discussed, light passing through the lens is filtered to enable the light emitted by component 400 to exhibit a spectral notch. This notch filtering of the light enables the component in some embodiments to exhibit the relatively high CRI previously described.

Still referring to FIG. 4, submount 452 is covered with a pattern of metal 454 to interconnect the LEDs if necessary and provide connection to a power supply. The metal pattern includes connection pads 485 with insulative material 492 in between. This particular pattern connects the LEDs visible in this view in series, but other connection schemes may be used depending on the desired operating characteristics of the device. Connecting LEDs in series produces a relatively high-voltage device, which may be desirable in some applications because power supply size can thus be minimized. As before, other components, such as ESD protection diodes may be present on the submount. The submount for device 400, as well as the submount for previously illustrated device 300, may be made of alumina or aluminum nitride, with our without filler. Other materials, for example high-temperature polymers, could be used.

With regard to multichip LED devices according to embodiments of the present disclosure, relatively small submounts may be provided for LED arrays with higher voltages where LED die bonding areas are more efficiently used to balance desired operating voltage with chip area. These factors can also be balanced with chip spacing to provide ease of manufacturing and less light absorption within a device. Spacing between chips may generally be on the order of 10 to 75 micrometers, although spacing as large as 150 or even 500 micrometers can be used in some embodiments.

Figure 5:
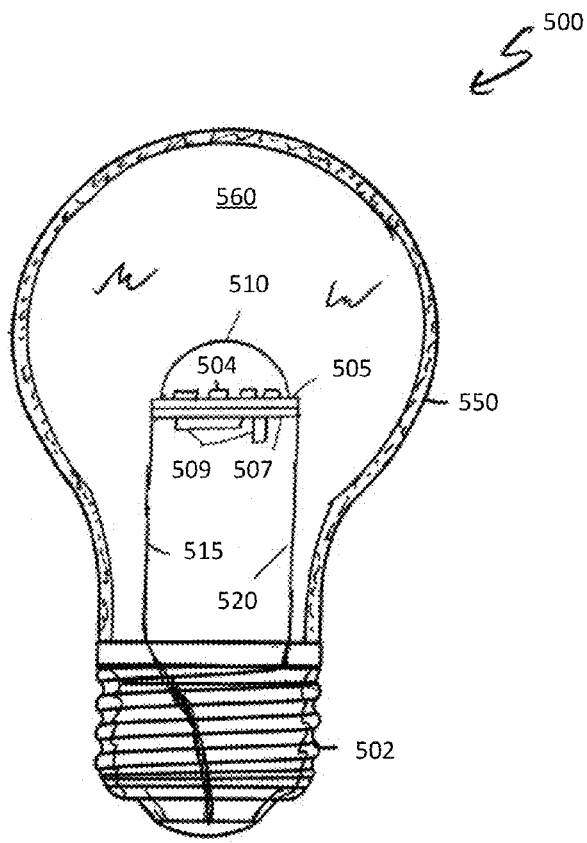
FIG. 5 is a cross-sectional view of an LED lamp according to additional example embodiments of the present disclosure.

FIG. 5 is a cross-sectional view of an LED lighting system according to further embodiments of the present disclosure. The LED lighting system of FIG. 5 is configured as a lamp, 500, which is an A-series lamp with an Edison base 502. In this case, LEDs 504 reside within an LED device 505 similar to the multichip devices previously described. The LED submount is mounted on a circuit board 507, which includes power supply components 509. Multichip LED device 505 includes a non-glass lens 510, however, an embodiment could be designed in which bare, or the present coating with or without phosphor is deposited on or directly on one or more LED die without a lens as described above. For example, bare blue LED could be left uncoated, whereas other colored LED's could be coated with the REE containing layer. Circuit board 507 is connected to the contacts in Edison base 502 via wires 515 and 520, and the electrical connections to supply power to the LED device from the power supply are self-contained in circuit board 507.

Still referring to FIG. 5, optical element 550 provides an optical enclosure that surrounds the circuit board and the LED device. The optical enclosure can be under a reduced atmosphere, a chosen gas-filled atmosphere, or, as shown, filled with an optically transmissive fluid medium 560. Optically transmissive fluid medium can comprise the at least one REE compound and be processed in accordance with the present method to provide at least one REE compound with at least an amount of non-crystalline or amorphous content. Additionally, or independently, the optical element 550, if glass, can include a coating deposited on or directly on one or both surfaces that comprises at least one rare earth compound with at least an amount of non-crystalline or amorphous content that gives the enclosure spectral notch-filtering properties as previously discussed. In other embodiment, and, when optical element 550 is non-glass, optical element 550 comprises at least one rare earth compound with at least an amount of non-crystalline or amorphous content, as indicated schematically by the pattern shown within the thickness of the optical enclosure in the drawing, that gives the enclosure spectral notch-filtering properties as previously discussed. It should be noted that a lamp like that shown in FIG. 5 could be constructed with the notch-filtering optical element as part of the LED device and a plain diffusion element as the external enclosure. A notch-filtering reflective element could also be used in combination with the present disclosure.

Figure 6:
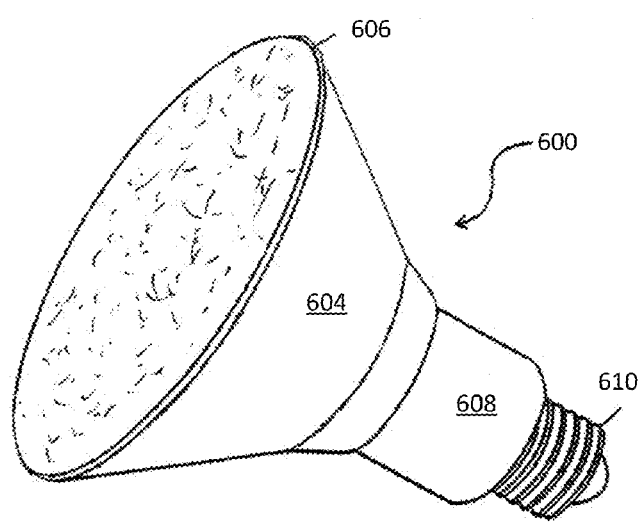
FIG. 6 is a perspective view of another LED lamp according further example embodiments of the present disclosure.

FIG. 6 is a perspective view of another LED lighting system, PAR-style lamp 600 that can serve as a replacement for a PAR-38 incandescent bulb. Lamp 600 includes a reflector 604 and a glass or plastic lens 606, which covers the front of lamp 600. In this case, the power supply (not shown) can be housed in base portion 608 of lamp 600. Lamp 600 includes an Edison base 610. Reflector 604 and lens 606 together form a light transmissive optical enclosure for the lamp, albeit light transmission in this case is directional. Note that a lamp like lamp 600 could be formed with a unitary enclosure, appropriately shaped and silvered or coated on an appropriate portion to form a directional, optically transmissive enclosure. Lamp 600 includes LED devices or dies (not visible) as previously discussed, and may in some embodiments include an optically transmissive fluid medium within the optically transmissive enclosure as previously discussed. As in other cases, lens is an optical element 606 of the lamp 600 can be a lens that is either coated or comprises at least one a rare earth compound with at least an amount of non-crystalline or amorphous content, as schematically indicated by the fill pattern in the drawing, as previously described above. Light passing through the lens 606 of the lamp is filtered to enable the light emitted by lamp 600 to exhibit a spectral notch. This notch filtering of the light enables the lamp in some embodiments to again exhibit the relatively high CRI previously described. As an alternative, a PAR lamp like that shown in FIG. 6 could additionally use a clear or diffusive lens and a notch-filtering reflector to improve CRI. The notch-filtering reflector can be constructed using a rare earth compound or compounds, an optical interference film as otherwise described herein, or a combination of the two.

Figure 7:
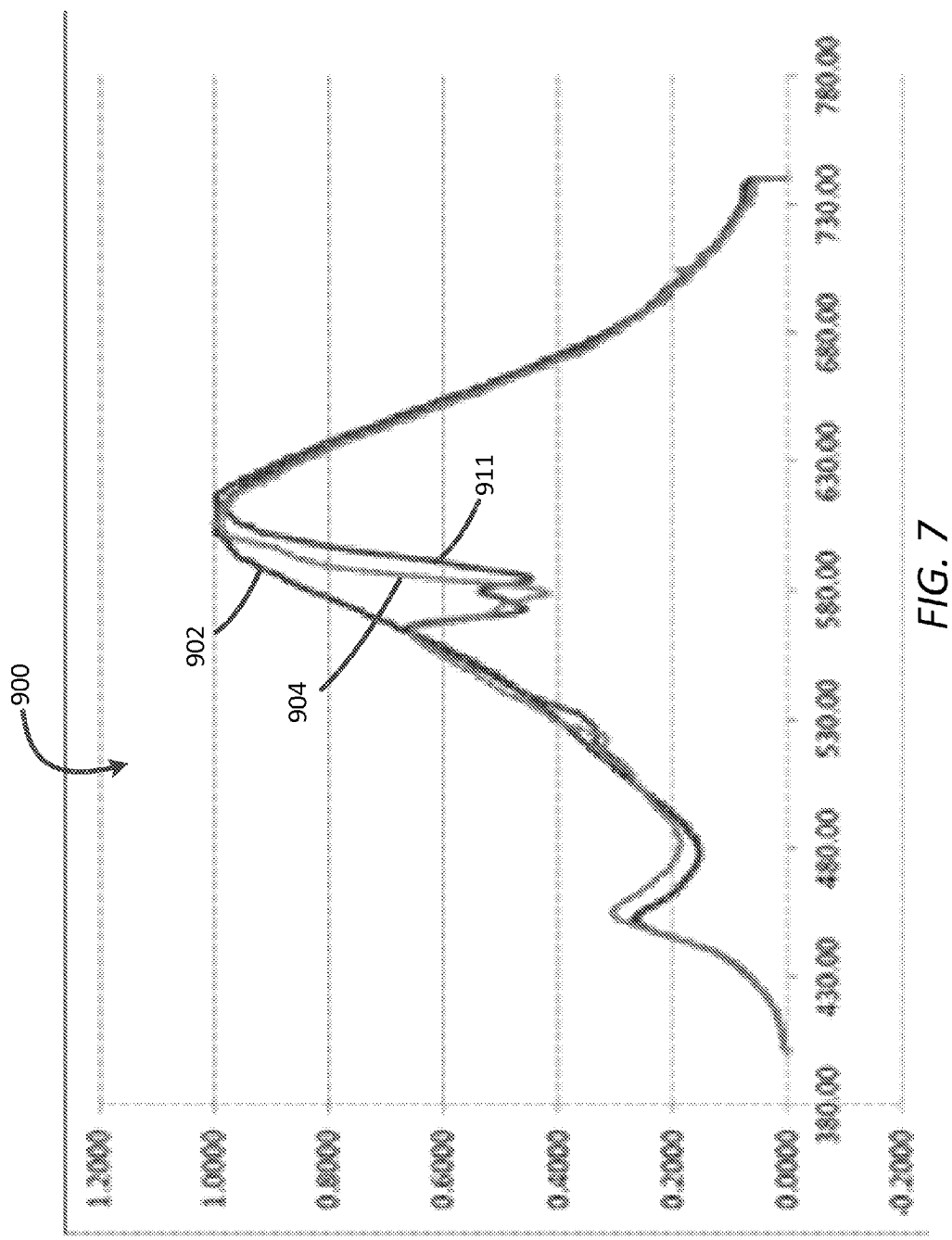
FIG. 7 is a graph illustrating the notch filtering properties of a coating embodiment of the present disclosure used with an LED device.

FIG. 7 is a light intensity graph illustrating a spectral notch that has been discussed herein. Graph 900 shows radiant flux on the vertical axis and wavelength of light in nanometers on the horizontal axis. Curve 902 is a plot of measurements taken of the light output of an LED lamp constructed of a high-voltage multichip LED component in a mineral-oil filled, plain glass enclosure. Curve 911 is a plot of measurements taken of the light output of an LED lamp that in most respects, except that the enclosure for the lamp measured for curve 911 is neodymium oxide doped glass. The notch where radiant flux is lower is clearly visible between the wavelengths of 550 nm and 600 nm. Curve 904 is a plot of measurements taken of the light output of an LED lamp that is the same as the LED lamp providing Curve 902 (a non-Nd-doped glass) but comprising the present coating, showing a spectral notch. similar to that of the Nd-doped glass. Thus, the REE compounds prepared by the method have substantially equivalent spectral notching performance to that of their crystalline counterparts.

It should be noted that throughout this disclosure, various filtering characteristics of optical elements are discussed using specific engineering terminology, and some of the concepts involved can be illustrated with graphs like that shown in FIG. 7 and the following figures. As an example, consider measurement 906 of FIG. 7. This measurement represents the width of the notch corresponding to the comparative reduction in light intensity at half the maximum reduction caused by the notch, otherwise known from the field of signal processing as the full width at half the maximum (FWHM). Of course peak attenuation or reduction of light intensity at the peak of the notch is also a significant characteristic. Another characteristic of a notch filter that is applicable can be referred to herein as the "shape profile" of the notch introduced by the filter. Again, from signal processing parlance, the shape profile is determined by Q-factor, and/or depth, and/or fall-off. Essentially, by shape profile what is meant is whether the notch is "soft" as in broad with gentle slopes, or "hard" as in more of a true "notch" in the generic sense, with steep sides.

Figure 8:
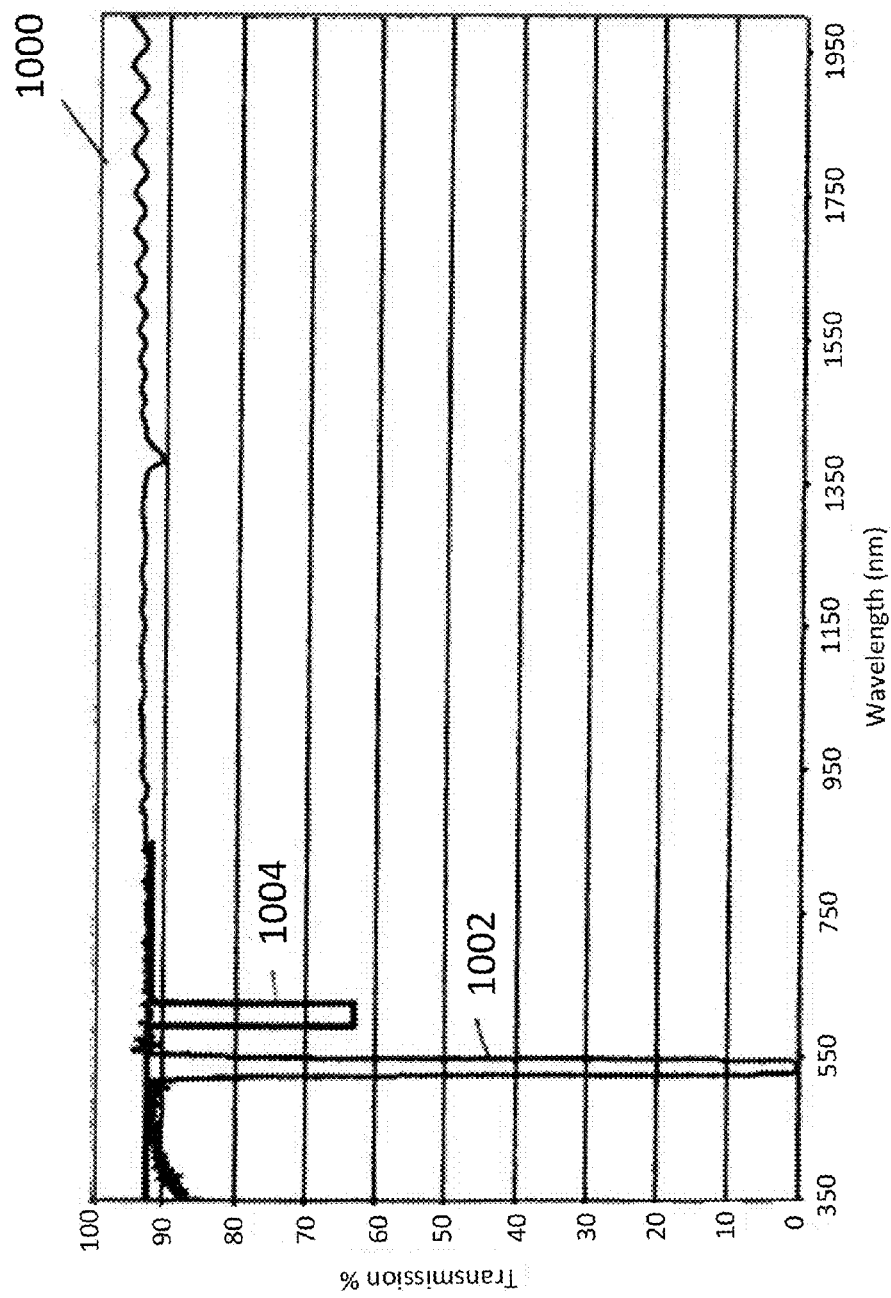
FIG. 8 is another graph illustrating notch filtering at a different frequency than that shown in FIG. 9.

FIG. 8 is a light intensity graph that illustrates additional concepts related to embodiments of the present disclosure. Graph 1000 shows radiant flux for a lighting system on the vertical axis and wavelength of light on the horizontal axis. In this particular example, notch-filtering is again shown with notch 1002, however this notch exhibits more attenuation and a different center wavelength than what has been previously shown for the case of neodymium oxide doping. Notch 1002 also has a "hard" shape profile, and a peak attenuation at or near 100 percent. Notch 1002 has a center wavelength of 532 nm. Notch 1004 is a notch like that previously described which is shown on the graph for comparison purposes. Notch 1002 in FIG. 10 is introduced in a reflective application by applying an optical interference film coating, essentially causing a reflector to filter light. Such coatings are commercially available, as an example, from Rugate Technologies, Inc., of Oxford, Conn. in the United States. It should be noted that filtering by optical interference can be accomplished in other ways as well, for example, by coating or impregnating an optical elements with microparticles or nanoparticles of a particular geometric shape. Any such techniques can be combined with the present coatings and methods herein disclosed.

FIG. 8 also illustrates that notch filtering can be applied to LED lighting system in various ways in that the notch can be tuned to various wavelengths and attenuation and fall-off can be adjusted for desired lighting characteristics. Spectral notches can be introduced at any wavelength within or outside the ranges discussed herein. The various rare earth compounds and methods discussed and the coatings therefrom discussed above each have their own characteristics regarding notch location and depth. Various REE compounds presently disclosed can also be combined with the above filters, and using the method disclosed, achieve multiple notches if desired.

Figure 9:
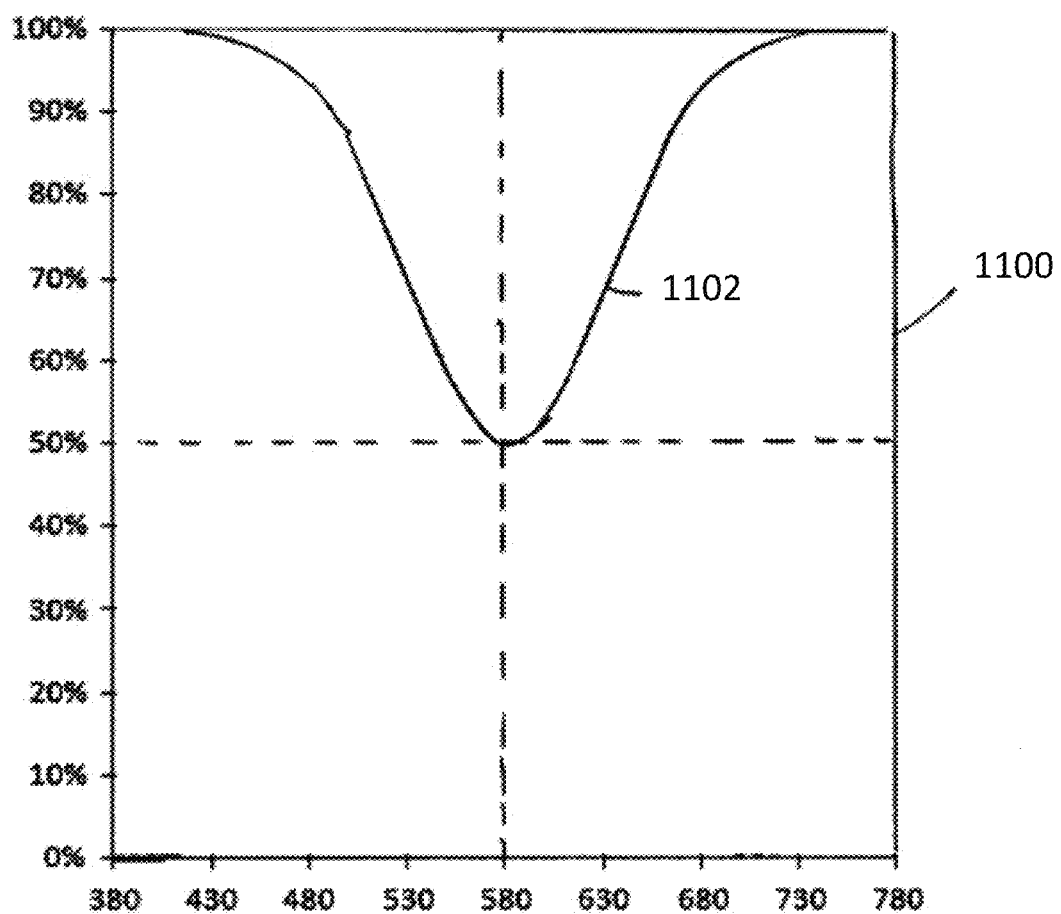
FIG. 9 is another graph illustrating the notch filtering properties of an optical element with a color pigment.

FIG. 9 illustrates a graph 1100 of the response of an optical notch filtering optical element according to additional embodiments of the present disclosure. In this example, filtering is accomplished by yet another method, the inclusion of a color pigment in or on the optical element. As with the use of rare earth compounds, the use of color pigment can impart notch filtering properties in wither transmissive or reflective applications. In this case, notch 1102 is a softer notch with a peak attenuation of about 50 percent and a frequency of about 580 nm. This notch has been introduced by use of ultramarine pigment based on $CoAl_2O_4$. A cobalt blue pigment of similar composition could also be used. Other color pigments based on $CuSO_4$ or $NiCl_2$ can also be used. A variety of both natural and synthetic pigments are available and could be used to create a notch filtering optical element or optical notch filter according to embodiments of the present disclosure. One or more of the REE compounds presently disclosed can also be combined using the method disclosed to achieve multiple notches if desired.

It cannot be overemphasized that the positions and characteristics of the "notch" or notches used in optical notch filtering as discussed herein vary widely, have differing effects, and can be changed and adjusted via different optical designs to achieve a desired result, and depending on the specifics of the light source. Various phosphors and combinations of phosphors can be used with LEDs of various colors, and even if substantially white light with high CRI is the goal, the notch characteristics may need to be adjusted according to the light source as well as the desired output of the lamp or fixture. For example, warm white LED devices can include a mix of yellow and green phosphor and/or a red/orange phosphor excited by a blue LED. The CRI of such a system with no additional filtering can range between 75 and 85. Notch filtering as described herein can increase CRI (also referred to as Ra) by more than ten points in one example. The color quality scale (CQS) and the gamut area index (GAI) are improved as well, with rendering of red (also referred to as R9) being increased, although efficacy and light output can be reduced. Results vary with different combinations of phosphors.

As an example of the above, the YAG and CAS phosphors previously mentioned come in various known formulations, each with as specific designation, and each with slightly different color characteristics. Using one or more of the REE compounds presently disclosed as a notch filtering optical element, with a combination of CASN1 and Y108 phosphors and a blue LED, CRI can increase from 84 to 90, R9 can increase from 36 to 84, total Color Quality Scale (CQS) can increase from 81 to 85 and gamut area index (GAI) can increase from 50 to 58. This is one example only, however.

Based on target thickness, the present compositions presented as coatings resulted in higher CRI's (about 93) and R9's (about 50) with LF loss as high as about 26%. When compared to other notch glass that is also in that range for loss, the R9 is typically higher compared to the present compositions, in part because of the difference in the notch region. An interaction of these factors with light output based on notch depth is typically observed, where all three provide reduction in lumens output by an LED bulb as adjusted by varying the depth of the notch. A notch depth of about 60 percent maximizes CRI and a notch depth of about 82 percent substantially maximizes CQS.

It should be further noted that the effect of the notch filter is, at least in part, produced by the width of the notch integrated with its depth. A very narrow (high Q) notch needs to be deep (produce strong attenuation at its center wavelength) to achieve a similar effect to a wider notch with a shallower depth. A notch with a center wavelength closer to red will have less effect on total output of the bulb or fixture. Also, the center wavelength of the notch filter can be complementary to the amount blue excitation from the LED(s) for maximum CRI and GAI in a blue-LED system.

Figure 10A:
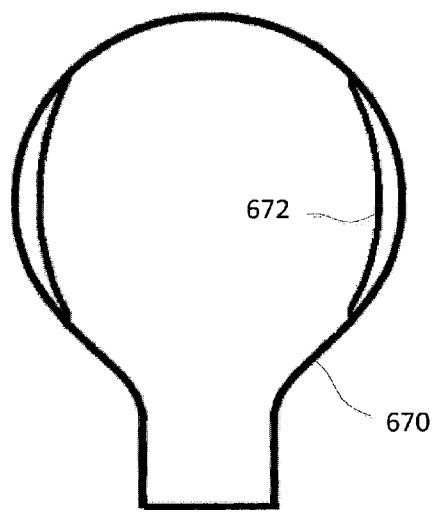
FIG. 10A, FIG. 10B, and FIG. 10C are perspective views of an LED devices with coatings according to some example embodiments of the present disclosure.
Figure 10B:
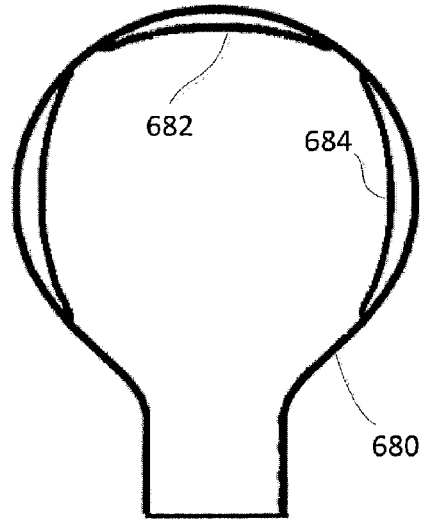
Figure 10C:
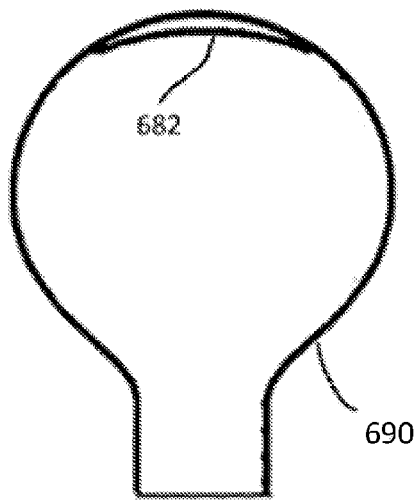
Figure 10D:
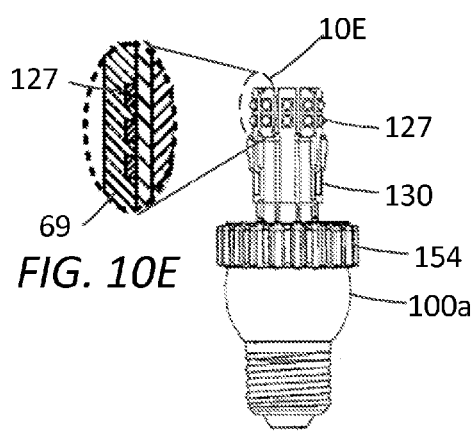
FIG. 10D is a perspective views of an LED device assembly according to some example embodiments of the present disclosure.

In one embodiment, as shown in FIGS. 10A, 10B, 10C, and 10D, one or more or a combination of coating processes can be used, for example, a dip or cascade coating in combination with a spray coating to deposit the instant coating on the optical element of an LED lamp. The LED lamp can be assembled, and then dip coated or sprayed using conventional techniques. In one aspect, a second spray coating process is used that can provide for one or more "bands" deposited on a first coating that was previously deposited on optical element 670, 680, 690 of an exemplary LED lamp so as to provide a variable (or a defined) thickness of coating 672, 682, 684 about the enclosure of the LED lamp, for example, the widest sections and/or the apex of the enclosure furthest from the Edison socket can be banded to improve optical properties. The "bands" can independently contain one or more REE compounds, phosphors and/or diffuser materials, each of which can be varied in compositional makeup, and/or concentration and thickness. Banding can be on the exterior and/or interior of the LED lamp enclosure. FIG. 10D and expanded view FIG. 10E depict a LED chip and/or LED assembly coated embodiment, where LED lamp 100a, can have cureable composition 505 deposited on or directly deposited on (not shown) components of LED lamp 100a. Suitable coating methods for such a lamp as that of LED lamp 100a include dip coating, spray coating, brush/roller coating, etc. As shown in FIG. 10D, a subsequently cured coating 69 can be formed on a LED assembly ("LED tower") that connects LED assembly 130 to a heat dissipating portion 154 and that positions and supports the LEDs 127 in the proper position in an enclosure, for example. Expanded view 10E as shown in FIG. 10E, depicts cured coating 69 covering at least a portion of individual LEDs 127 of LED assembly 130.

Figure 11:
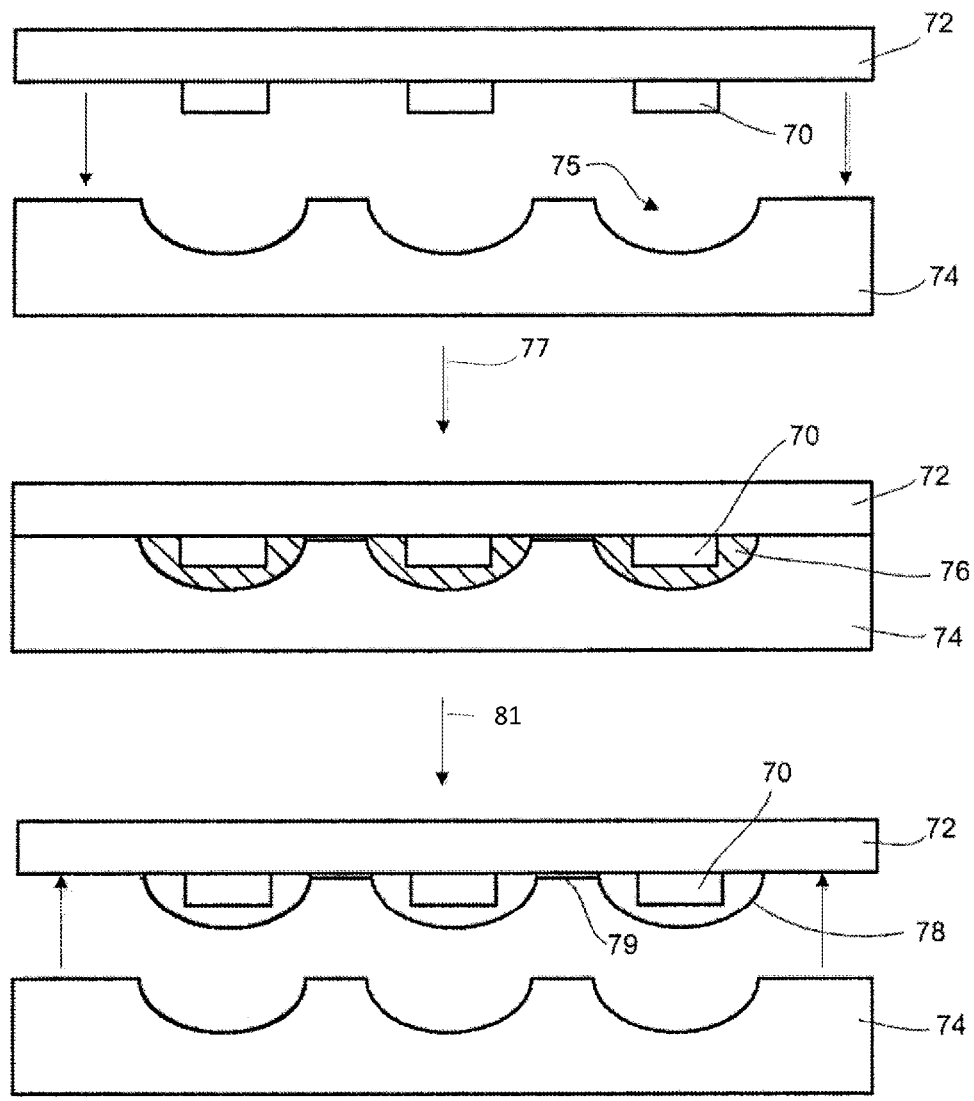
FIG. 11 depicts a molding process embodiment of the present to thermoform an optical element in accordance with an embodiment of the present disclosure.

FIG. 11 depicts a molding process in which the REE compound is combined with a thermoplastic, thermoplastic elastomer, or high durometer silicone or polyurethane (e.g., a Reaction-Injected-Molded (RIM)), subjected to heat above the thermal transition temperature of the RE compound (melting or de-hydration, etc.) and used to thermoform an optical element. Thus, substrate 72 with LED elements 70 are presented to mold 74 having cavities 75 configured to form optical elements about LED elements 70, the substrate 72 and mold 74 closed as in Step 77 and RE compound with polymer matrix (collectively 76) is introduced into cavity 75. Step 81 shows release of the substrate 72 from mold 75 after cooling or solidification of RE/polymer matrix 76 to provide optical elements 78 about LED elements 70. Areas 79 between LED elements 70 can provide isolation.

In one embodiment, a curable polymer matrix is used that comprises the at least one REE compound having a thermal transition at or below the decomposition temperature of the curable polymer matrix. In one aspect, a curable polymer matrix is used that comprises the at least one REE compound having a thermal transition at or below a cure temperature of the curable polymer matrix. The cure temperature can be suppressed with one or more agents added to the polymer matrix, for example, using an alkynol compound to suppress the curing of a silicone hydride/silicone-alkene, noble metal catalyzed two-part system. After the coating and/or precursor components are deposited on the LED lamp, the coating can be cured, or the cure process can be accelerated, by using heat and/or light to initiate and/or accelerate the crosslinking or coupling of the precursor components or to overcome the viscosity stabilizer.

Examples

Any aspect or features of any of the embodiments described herein can be used with any feature or aspect of any other embodiments described herein or integrated together or implemented separately in single or multiple components.

While solvents such has acetone or IPA can be used to dissolve REE's such as neodymium nitrate hexahydrate, REE's are typically highly water soluble, their solubility in solvents that are compatible to provide mixing with hydrophobic polymers, e.g., silicones, is extremely limited and this solvent-based method has not produced favorable results with silicone-based materials useful for spectral notching elements or coatings. A solvent-less solution therefore has been developed to integrate a REE compound into one or both parts of a two part silicone to provide spectral filtering element and coating, which is readily extendable to mixing with other hydrophobic polymers and compatible with melt-mixing methods such as compounding, reactive injection molding, and the like.

Thus, in one example, neodymium nitrate hexahydrate was physically dispersed or distributed in one or both parts of a two part silicone resin precursor with heating to a temperature sufficient to cause a thermal transition of the REE compound. The mixing/heating process can be monitored with a DSC or until the mixture is visibly homogenous and/or clear. The mixture can be stored until use with little or no change in viscosity. When ready for use, a silicone catalyst (e.g., platinum compound) may be mixed in and the silicone can then be applied to one or more LED components by standard techniques such as dip coating, spraying, blade, etc.

Using a two part silicone precursor system as an exemplary hydrophobic polymer matrix, a crystalline REE compound was added to one component of the silicone so that it can be heated without any curing of the silicone taking place. After the crystal REE material was added, the silicone part containing the crystals was heated to a temperature above the thermal transition point of the crystalline material (>100 C, <250 C). In one aspect, vacuum was used to minimize the temperature of the precursor material and/or to facilitate water removal. Indeed, for some REE hydrates, at or below 150 C may not remove sufficient quantities of waters of hydration, or provide melting, or cause degradation of some precursor formulations. While in a melted state the material was mixed in a planetary or asymmetric centrifugal mixer. The material was optionally placed under vacuum while above the thermal transition point of the REE to allow for the removal of the $H_2O$ from the compound. Once completed, the mixture may be cooled and stored for later use, and the second component of the two-part curable polymer matrix can be mixed. The incorporation of the rare earth material is such that no visible settling or suspension of particulate matter is observed as would be typical of a solution containing fine crystals or powders.

Figure 12:
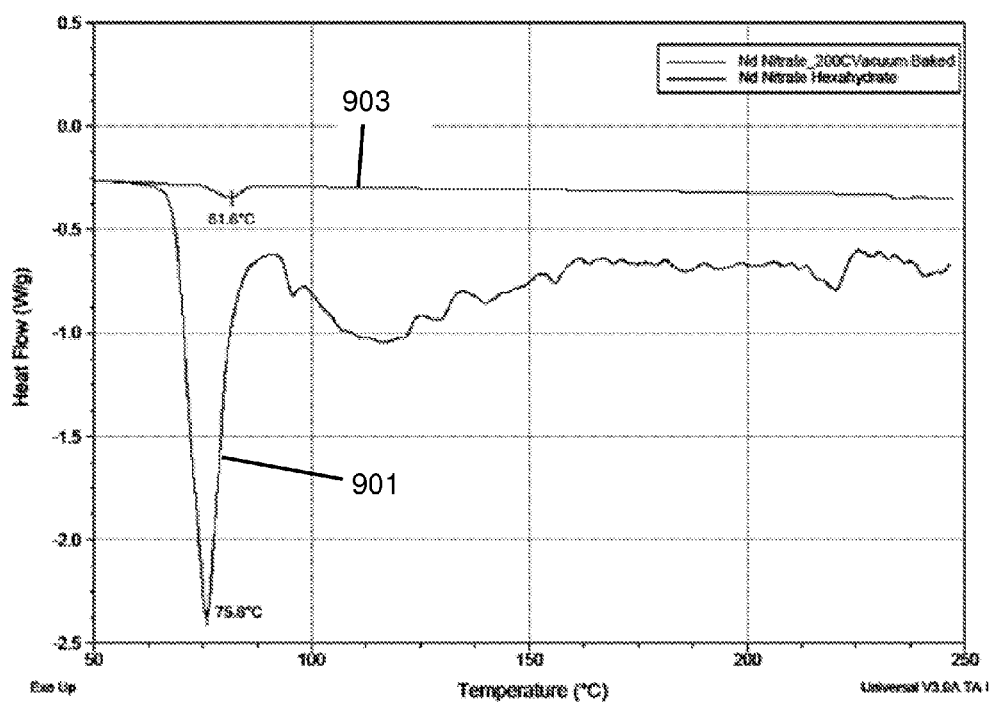
FIG. 12 is a Differential Scanning calorimetry (DSC) scan of a thermal transition of an exemplary REE compound in accordance with an embodiment of the present disclosure.

In a general sense, dispersing or distributing one or more REE hydrates with one component of a two part silicone system and heating at a temperature above a thermal transition temperature of the REE hydrate is provided. It is believed that waters of hydration are released and/or melting of the RE compound provides enhanced distribution/dispersion/mixing with the hydrophobic matrix, in this case a silicone, as evident by visual homogeneity of the resultant mixture. It is believed that the degree of crystallinity of the starting REE hydrate is reduced by the present method, and, alternatively, the REE is de-hydrated and forms a complex with the silicone matrix. As shown in FIG. 12 heating neat $NdNO_3$ hydrate between 50 and 150 degrees Centigrade results in heat absorption as shown by curve 901, believed to be melting and/or loss of water of hydration, as compared with a vacuum-dried sample having curve 903 showing small peak at similar temperature.

Figure 13:
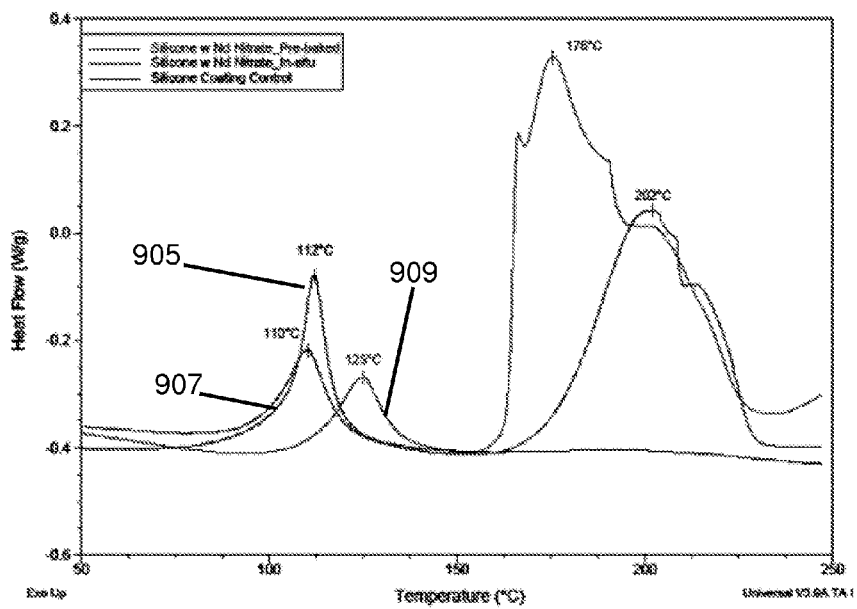
FIG. 13 is another Differential Scanning calorimetry (DSC) scan of a thermal transition of an exemplary REE compound in accordance with an embodiment of the present disclosure.

In other aspects, degassing the mixed or dispensed solution of REE hydrate under vacuum at an elevated temperature is sufficient to remove at least some of the water from the RE compound and to provide improved distribution/dispersion/mixing with the polymer matrix. As shown in FIG. 13, DSC trace 905 depicts a mixture of both parts of a two-part curable silicone polymer matrix showing cure at about 112° C., DSC trace 907 showing neat $NdNO_3$ hydrate mixed with only part A of the two-part curable silicone polymer matrix first and heated to remove hydrate and to at least partially reduce crystallinity prior to mixing with part B showing thermal transition of REE at about 110° C.

In other aspects, dehydrating and melting the REE hydrate compound in a vacuum at a temperature above its determined melting point facilitates remove water from the compound and caused reduced crystallinity. Subsequently, the dehydrated REE compound can be combined with a solvent and mixed with one component of a two part silicone. Alternatively, the dehydrated REE compound can be heated under vacuum to remove the solvents. Thus, as shown in FIG. 13, DSC trace 909 showing $NdNO_3$ hydrate previously vacuum dried and mixed with only part A, then combined with part B of the two part curable silicone polymer matrix showing slightly elevated polymer cure temperature of about 125 C without an additional thermal transition associated with the REE.

FIG. 14A and FIG. 14B depict at least one method of determining an amount of non-crystalline form (or change). Thus, an x-ray diffraction scan of a vacuum dried $NdNO_3$ hydrate sample and a neat $NdNO_3$ hydrate sample. As seen in FIGS. 14A and expanded section 14B, spectra 925 representing vacuum dried $NdNO_3$ hydrate is reduced in crystallinity relative to neat $NdNO_3$ hydrate spectra 927, indicating that the method disclosed is effective at altering the morphology of the REE compound and therefore providing more efficient mixing with the polymer matrix useful for forming coatings.

The presently disclosed precursor components and resulting coating comprising one or more REE compounds prepared therefrom provide a number of solutions to recognized problems with LED lamps having a frangible enclosure. In one aspect, the resultant light transparent polymeric matrix coating of the present disclosure, when present on a surface of an enclosure of an LED lamp, is capable of preventing or eliminating access to the internal components of the LED lamp should the enclosure be subjected to force that would otherwise shatter, chip, or break open the enclosure.

It cannot be overemphasized that with respect to the features described above with various example embodiments of a LED lamp, the features can be combined in various ways. For example, the various methods of including phosphor in the lamp can be combined and any of those methods can be combined with the use of various types of LED arrangements such as bare die vs. encapsulated or packaged LED devices. The embodiments shown herein are examples only, shown and described to be illustrative of various design options for a lamp with an LED array.

The various parts of an LED lamp according to example embodiments of the present disclosure can be made of any of various materials. A lamp according to embodiments of the present disclosure can be assembled using varied fastening methods and mechanisms for interconnecting the various parts. For example, in some embodiments locking tabs and holes can be used. In some embodiments, combinations of fasteners such as tabs, latches or other suitable fastening arrangements and combinations of fasteners can be used which would not require adhesives or screws. In other embodiments, adhesives, solder, brazing, screws, bolts, or other fasteners may be used to fasten together the various components.

Although specific embodiments have been illustrated and described herein, those of ordinary skill in the art appreciate that any arrangement, which is calculated to achieve the same purpose, may be substituted for the specific embodiments shown and that the present disclosure has other applications in other environments. This application is intended to cover any adaptations or variations of the present disclosure. The following claims are in no way intended to limit the scope of the present disclosure to the specific embodiments described herein.

We claim:

1. A composition comprising a polymer matrix comprising at least one rare-earth element (REE) compound, at least an amount of the REE compound present in an amorphous or non-crystalline form, or present substantially without hydrate forms, the at least one REE compound has a melting point less than a decomposition temperature or a cure temperature of the polymer matrix.

2. The composition of claim 1, further comprising a polymer matrix of one or more polysiloxanes, polycarbonates, poly(meth)acrylates, thermoplastics, thermoplastic elastomers, thermosets, or polyurethanes.

3. The composition of claim 1, wherein the at least one REE compound comprises a REE selected from neodymium, didymium, dysprosium, erbium, holmium, praseodymium, and thulium.

4. The composition of claim 1, wherein the at least one REE compound is a REE nitrate, phosphate, sulfate, halide, carbonate, alkoxide, or acetate.

5. The composition of claim 1, wherein the at least one REE compound is a REE nitrate, phosphate, sulfate, halide, carbonate, alkoxide, or acetate with one or more waters of hydration removed.

6. The composition of claim 1, further comprising one or more phosphors or diffusers.

7. The composition of claim 1, wherein the at least one REE compound excludes REE oxides, REE silicates, REE aluminates, or crushed REE-doped glass particles.

8. The composition of claim 1, the composition is integral with an LED encapsulant, an optical lens, a diffuser, or a reflector.

9. The composition of claim 1, comprising a mixture of two or more REE compounds, at least an amount of one of the two or more REE compounds present in an amorphous, non-crystalline, or non-hydrate form within the polymer matrix; and at least an amount of one of the two or more REE compounds present in a crystalline form within the polymer matrix.

10. The composition of claim 9, wherein at least an amount of one of the two or more REE compounds present in a crystalline form is a REE oxide, a REE silicate, a REE aluminate, or crushed REE-doped glass particles.

11. The composition of claim 1, wherein the polymer matrix comprising the least one rare-earth element (REE) compound is disposed on or integral with a substrate.

12. The composition of claim 11, wherein the substrate is an LED chip, an LED array, a portion of an LED package, an LED encapsulant, an optical lens, a diffuser, or a reflector.

13. The composition of claim 1, wherein the composition is at least partially non-transparent to light between about 350 nm to about 850 nm.

14. The composition of claim 13, wherein the composition is at least partially non-transparent to light between the wavelengths of 520 nm and 605 nm.

15. The composition of claim 13, wherein the composition is at least partially non-transparent to light between the wavelengths of 565 nm and 600 nm.

16. The composition of claim 13, wherein the composition is at least partially non-transparent to light between the wavelengths of 570 nm and 595 nm.

17. A method of preparing a composition, the method comprising:
combining at least one REE compound with a polymer matrix or one or more polymer matrix precursors, the at least one REE compound having a crystalline form or a hydrate form; and
heating the combination of the at least one REE compound and the polymer matrix or the at least one of the one or more polymer matrix precursors above a thermal transition temperature of the at least one REE compound; and
obtaining the composition as defined in claim 1.

18. The method of claim 17, wherein the thermal transition temperature of the at least one REE compound is at least partial melting of the crystalline form.

19. The method of claim 17, wherein the thermal transition temperature of the at least one REE compound is at least partial dehydration of the hydrate form.

20. The method of claim 17, wherein the one or more polymer matrix precursors are substantially organic solvent-free.

21. The method of claim 17, wherein the at least one REE compound is a REE nitrate, phosphate, sulfate, halide, carbonate, alkoxide, or acetate.

22. The method of claim 17, wherein the heating step is performed under vacuum.

23. The method of claim 17, wherein the composition is integral with a visible light transparent lens.

24. The method of claim 17, further comprising contacting an LED, an LED array, a phosphor-coated LED, or reflector, diffuser, or enclosure with the combined at least one REE compound with the polymer matrix or the polymer matrix precursor before or after heating.

25. The method of claim 17, wherein the one or more polymer matrix precursors comprises one or more curable oligomeric or polymeric polysilicones, polysiloxanes, or polyurethanes, or, the polymer matrix comprises one or more thermoplastics, thermoplastic elastomers, or thermosets.

26. The method of claim 25, wherein the composition comprises one or more curable oligomeric siloxanes having alkenyl-containing functional groups and/or silicon hydride functional groups.

27. The method of claim 25, wherein the composition further comprising a viscosity stabilizer in an amount sufficient to inhibit curing.

28. The method of claim 25, wherein the composition comprises a curable thermoplastic polymer or thermoplastic elastomer having a durometer sufficient for forming an optical element when cured.

* * * * *